US009057265B2

(12) United States Patent
Frazier et al.

(10) Patent No.: US 9,057,265 B2
(45) Date of Patent: Jun. 16, 2015

(54) ROTARY COMPRESSOR-EXPANDER SYSTEMS AND ASSOCIATED METHODS OF USE AND MANUFACTURE

(75) Inventors: Scott R. Frazier, Morrison, CO (US); John Tandler, Arvada, CO (US); Jacob Fitzgerald, Denver, CO (US); Alexander Lau, Vancouver (CA); Brian Von Herzen, Minden, NV (US)

(73) Assignee: Bright Energy Storage Technologies LLP., Denver, CO (US)

( * ) Notice: Subject to any disclaimer, the term of this patent is extended or adjusted under 35 U.S.C. 154(b) by 692 days.

(21) Appl. No.: 13/038,345

(22) Filed: Mar. 1, 2011

(65) Prior Publication Data

US 2011/0209480 A1 Sep. 1, 2011

Related U.S. Application Data

(60) Provisional application No. 61/309,415, filed on Mar. 1, 2010.

(51) Int. Cl.
| | |
|---|---|
| *F01C 1/02* | (2006.01) |
| *F01C 1/22* | (2006.01) |
| *F01C 11/00* | (2006.01) |
| *F01C 21/06* | (2006.01) |

(52) U.S. Cl.
CPC .............. *F01C 1/22* (2013.01); *Y10T 29/49245* (2015.01); *F01C 11/002* (2013.01); *F01C 21/06* (2013.01); *Y02T 10/16* (2013.01)

(58) Field of Classification Search
CPC .......... F01C 1/22; F01C 11/002; F01C 21/06; Y10T 29/49245; Y02T 10/16
USPC ........................................ 418/112, 113, 61.2
See application file for complete search history.

(56) References Cited

U.S. PATENT DOCUMENTS

| 125,166 A | 4/1872 | Brayton |
|---|---|---|
| 226,052 A | 3/1880 | Ericsson |

(Continued)

FOREIGN PATENT DOCUMENTS

| GB | 1202125 A | 8/1970 |
|---|---|---|
| GB | 2396664 A | 6/2004 |

(Continued)

OTHER PUBLICATIONS

International Search Report and Written Opinion for International Patent Application No. PCT/US11/26762, Applicant: Frazier, Scott, mailed Jun. 1, 2011, 40 pages.

(Continued)

*Primary Examiner* — Hoang Nguyen
(74) *Attorney, Agent, or Firm* — Perkins Coie LLP

(57) ABSTRACT

The present technology is directed generally to rotary displacement systems and associated methods of use and manufacture. The systems can be used to compress and/or expand compressible fluids. In some embodiments, the rotary displacement systems include a chamber housing having a pressure-modifying chamber with a first port and a second port, a first passageway in fluid communication with the chamber via the first port, and a second passageway in fluid communication with the chamber via the second port. The systems can further include a shaft positioned within the chamber housing and rotatable relative to the chamber housing about a rotational axis, and a rotor comprising no more than two lobes. The rotor can be carried by and rotatable relative to the shaft, and can be alternately operable in a first mode in which flow is provided from the first passageway to the second passageway via the chamber and in a second mode in which flow is provided from the second passageway to the first passageway via the chamber.

32 Claims, 14 Drawing Sheets

(56) References Cited

U.S. PATENT DOCUMENTS

| | | | |
|---|---|---|---|
| 1,297,363 A | 3/1919 | Kneedler et al. | |
| 1,310,157 A * | 7/1919 | De Campo | 418/54 |
| 1,641,121 A | 8/1927 | Creel | |
| 1,895,816 A | 8/1927 | Pfeiffer | |
| 1,782,314 A * | 11/1930 | Poirmeur | 418/112 |
| 2,298,525 A | 10/1942 | Briggs | |
| 2,693,031 A | 11/1954 | Clark et al. | |
| 3,190,227 A | 6/1965 | Davids et al. | |
| 3,225,661 A * | 12/1965 | Smyser et al. | 418/112 |
| 3,295,505 A * | 1/1967 | Jordan | 123/241 |
| 3,426,525 A | 2/1969 | Rubin | |
| 3,533,716 A | 10/1970 | Grun | |
| 3,621,654 A | 11/1971 | Hull | |
| 3,677,008 A * | 7/1972 | Koutz | 60/650 |
| 3,743,454 A | 7/1973 | Rinehart | |
| 3,744,245 A * | 7/1973 | Kelly | 60/519 |
| 3,762,167 A | 10/1973 | Wahnschaffe et al. | |
| 3,783,615 A | 1/1974 | Hubers | |
| 3,791,352 A | 2/1974 | Takacs | |
| 3,797,973 A | 3/1974 | Prasse et al. | |
| 3,800,760 A | 4/1974 | Knee | |
| 3,844,692 A * | 10/1974 | McLain | 418/113 |
| 3,883,273 A | 5/1975 | King | |
| 3,891,357 A | 6/1975 | Davis et al. | |
| 3,899,272 A | 8/1975 | Pratt | |
| 3,945,220 A | 3/1976 | Kosfeld | |
| 3,958,907 A * | 5/1976 | Goloff | 418/91 |
| 3,959,907 A * | 6/1976 | Anderson | 40/702 |
| 3,970,050 A | 7/1976 | Hoadley | |
| 3,986,359 A | 10/1976 | Manning et al. | |
| 3,990,817 A * | 11/1976 | Ruf et al. | 418/61.2 |
| 4,009,573 A | 3/1977 | Satz | |
| 4,023,366 A | 5/1977 | Schneider | |
| 4,058,988 A * | 11/1977 | Shaw | 62/160 |
| 4,106,472 A * | 8/1978 | Rusk | 123/205 |
| 4,118,157 A | 10/1978 | Mayer | |
| 4,118,158 A | 10/1978 | Osaki | |
| 4,133,172 A | 1/1979 | Cataldo | |
| 4,215,533 A | 8/1980 | Silvestri | |
| 4,224,798 A | 9/1980 | Brinkerhoff | |
| 4,300,874 A * | 11/1981 | Georgiev | 418/54 |
| 4,345,886 A | 8/1982 | Nakayama et al. | |
| 4,367,638 A | 1/1983 | Gray | |
| 4,434,757 A * | 3/1984 | Walker | 123/241 |
| 4,739,632 A | 4/1988 | Fry | |
| 4,759,325 A | 7/1988 | Jones | |
| 4,760,701 A | 8/1988 | David | |
| 4,773,846 A | 9/1988 | Munk | |
| 4,864,985 A | 9/1989 | Slee | |
| 4,885,909 A * | 12/1989 | Rodgers | 60/772 |
| 5,050,570 A | 9/1991 | Thring | |
| 5,127,377 A | 7/1992 | Yang | |
| 5,199,864 A * | 4/1993 | Stecklein | 418/68 |
| 5,212,942 A | 5/1993 | Malohn | |
| 5,239,833 A * | 8/1993 | Fineblum | 62/6 |
| 5,391,067 A * | 2/1995 | Saunders | 418/60 |
| 5,494,424 A | 2/1996 | Schnell | |
| 5,522,235 A | 6/1996 | Matsuoka et al. | |
| 5,537,822 A * | 7/1996 | Shnaid et al. | 60/659 |
| 5,590,528 A | 1/1997 | Viteri | |
| 5,832,728 A | 11/1998 | Buck | |
| 5,839,270 A | 11/1998 | Jirnov et al. | |
| 5,894,729 A | 4/1999 | Proeschel | |
| 5,960,625 A | 10/1999 | Zdvorak, Sr. | |
| 6,085,506 A | 7/2000 | Fineblum | |
| 6,092,365 A | 7/2000 | Leidel | |
| 6,336,317 B1 | 1/2002 | Holtzapple et al. | |
| 6,464,467 B2 * | 10/2002 | Sullivan et al. | 417/53 |
| 6,499,534 B1 | 12/2002 | Tawney et al. | |
| 6,530,211 B2 | 3/2003 | Holtzapple et al. | |
| 6,606,860 B2 | 8/2003 | McFarland | |
| 6,659,065 B1 | 12/2003 | Renegar | |
| 6,672,063 B1 | 1/2004 | Proeschel | |
| 6,718,751 B2 | 4/2004 | Mehail | |
| 6,796,123 B2 | 9/2004 | Lasker | |
| 6,817,185 B2 * | 11/2004 | Coney et al. | 60/772 |
| 6,886,326 B2 | 5/2005 | Holtzapple et al. | |
| 6,926,505 B2 * | 8/2005 | Sbarounis | 418/54 |
| 6,929,505 B2 | 8/2005 | He et al. | |
| 6,944,935 B2 * | 9/2005 | Hache | 29/598 |
| 6,955,052 B2 | 10/2005 | Primlani | |
| 7,028,476 B2 | 4/2006 | Proeschel | |
| 7,097,436 B2 | 8/2006 | Wells | |
| 7,240,478 B2 | 7/2007 | Kopko | |
| 7,249,459 B2 * | 7/2007 | Hisanaga et al. | 60/641.1 |
| 7,401,475 B2 | 7/2008 | Hugenroth et al. | |
| 7,481,189 B2 | 1/2009 | Zajac | |
| 7,549,841 B1 * | 6/2009 | Marussich | 415/173.3 |
| 7,614,861 B2 | 11/2009 | Nagler | |
| 7,745,946 B2 * | 6/2010 | Ambrose | 290/1 A |
| 7,765,785 B2 | 8/2010 | Kashmerick | |
| 7,866,962 B2 | 1/2011 | Newland | |
| 8,006,496 B2 | 8/2011 | Carter | |
| 8,037,677 B2 | 10/2011 | Fong et al. | |
| 8,096,117 B2 * | 1/2012 | Ingersoll et al. | 60/408 |
| 8,176,748 B2 * | 5/2012 | Cao | 62/401 |
| 8,196,395 B2 * | 6/2012 | Fong et al. | 60/370 |
| 8,201,402 B2 * | 6/2012 | Fong et al. | 60/371 |
| 8,207,402 B2 | 6/2012 | Teoh et al. | |
| 8,240,142 B2 * | 8/2012 | Fong et al. | 60/408 |
| 8,247,915 B2 * | 8/2012 | Crane et al. | 290/44 |
| 8,261,552 B2 | 9/2012 | Nakhamkin | |
| 8,308,458 B2 | 11/2012 | Kettlewell et al. | |
| 8,359,857 B2 * | 1/2013 | Ingersoll et al. | 60/512 |
| 2001/0025478 A1 | 10/2001 | Fineblum | |
| 2002/0028151 A1 * | 3/2002 | Manner et al. | 418/61.2 |
| 2002/0114706 A1 | 8/2002 | Bassine | |
| 2003/0049139 A1 | 3/2003 | Coney et al. | |
| 2004/0129018 A1 | 7/2004 | Rini et al. | |
| 2005/0180874 A1 * | 8/2005 | Wells | 418/113 |
| 2006/0127264 A1 | 6/2006 | Aquino et al. | |
| 2006/0233653 A1 * | 10/2006 | Trapalis | 418/54 |
| 2006/0242942 A1 | 11/2006 | Johnson | |
| 2006/0248886 A1 | 11/2006 | Ma | |
| 2006/0260312 A1 | 11/2006 | Ingersoll | |
| 2007/0044751 A1 * | 3/2007 | Guan et al. | 123/245 |
| 2007/0234749 A1 | 10/2007 | Enis et al. | |
| 2007/0295673 A1 | 12/2007 | Enis et al. | |
| 2008/0000775 A1 | 1/2008 | Childers et al. | |
| 2008/0095652 A1 * | 4/2008 | Jiang | 418/48 |
| 2008/0149066 A1 * | 6/2008 | Hendrix et al. | 123/242 |
| 2008/0226480 A1 | 9/2008 | Ferran et al. | |
| 2009/0038597 A1 * | 2/2009 | Phillips | 123/70 R |
| 2009/0081061 A1 * | 3/2009 | Chomyszak et al. | 418/35 |
| 2009/0211260 A1 | 8/2009 | Kesseli et al. | |
| 2010/0089062 A1 * | 4/2010 | Cao | 60/682 |
| 2010/0251757 A1 | 10/2010 | Hasegawa et al. | |
| 2010/0257862 A1 | 10/2010 | Howes et al. | |
| 2011/0023488 A1 * | 2/2011 | Fong et al. | 60/659 |
| 2011/0023814 A1 | 2/2011 | Shkolnik et al. | |
| 2011/0070031 A1 | 3/2011 | Frazier et al. | |
| 2011/0070032 A1 * | 3/2011 | Frazier et al. | 405/210 |
| 2011/0115223 A1 | 5/2011 | Stahlkopf et al. | |
| 2011/0204064 A1 * | 8/2011 | Crane et al. | 220/592 |
| 2011/0209477 A1 * | 9/2011 | Frazier et al. | 60/645 |
| 2011/0209480 A1 * | 9/2011 | Frazier et al. | 60/670 |
| 2011/0211916 A1 | 9/2011 | Frazier et al. | |
| 2011/0217197 A1 * | 9/2011 | Frazier et al. | 418/1 |
| 2012/0012089 A1 * | 1/2012 | Phillips | 123/70 R |
| 2012/0012276 A1 * | 1/2012 | Von Herzen et al. | 165/45 |
| 2012/0048230 A1 * | 3/2012 | Darrow | 123/236 |
| 2012/0048320 A1 | 3/2012 | Hardie | |
| 2012/0119510 A1 * | 5/2012 | Herzen et al. | 290/1 C |
| 2012/0224986 A1 * | 9/2012 | Shimaguchi et al. | 417/410.3 |

FOREIGN PATENT DOCUMENTS

| | | |
|---|---|---|
| GB | 2396887 A | 7/2004 |
| RU | 2432471 C2 | 10/2011 |
| WO | WO-8606437 A1 | 11/1986 |
| WO | WO-2008050654 A1 | 5/2008 |
| WO | WO-2009073406 A2 | 6/2009 |

(56) References Cited

FOREIGN PATENT DOCUMENTS

| WO | WO-2010/017199 A2 | 2/2010 |
| WO | WO-2011109449 A1 | 9/2011 |

OTHER PUBLICATIONS

"Passing Gas—A look at how different compressors ; work," http://www.fscconline.com/%22Passing%20Gas%ss-articie/passing_gas.html, accessed Mar. 2, 2011, 3 pages.

"The Guided Rotor Compressor—A Compressor for the; the 21st Century," http://www.grcompressor.com/ Mar. 2, 2011, 16 pages.

ZPS—Ziolkowski Patent Solutions Group SC, Imagine Invent Protect®, http://zpspatents.com, Mar. 2, 2011, 1 page.

Johansson, Bengt, "Path to Koh Efficiency Gasoline Engine," Division of Combustion Engines, Department of Energy Sciences: Lund University, 102 pages.

* cited by examiner

ROTARY COMPRESSOR-EXPANDER SYSTEMS AND ASSOCIATED METHODS OF USE AND MANUFACTURE

CROSS-REFERENCE TO RELATED APPLICATION

The present application claims priority to and the benefit of U.S. Provisional Patent Application No. 61/309,415, filed on Mar. 1, 2010 and titled UNDERWATER COMPRESSED AIR ENERGY STORAGE, which is incorporated herein by reference in its entirety.

TECHNICAL FIELD

The present technology is directed generally to rotary compressor-expander systems, e.g., for compressing, storing, and/or releasing compressed fluids.

BACKGROUND

Power demand from an electric system can vary considerably. In order to improve the efficiency of an electric system, it is desirable to store excess, off-peak, and renewably-generated electricity so that the stored electricity can be utilized when demand is high. There are several available methods for storing energy which is later used to produce electricity, including batteries, elevated hydro systems, and compressed air energy storage (CAES) systems.

CAES systems compress atmospheric air in a compressor driven by energy from the electric system. The compressed air is stored in a compressed air reservoir, e.g., a geological formation or other structure. When the energy is demanded, the compressed air can be heated and expanded to generate electricity. Various devices can be used to compress and expand the air for the CAES system. For example, a positive displacement machine (PDM), such as a typical internal combustion engine, reciprocating air compressor, or rotary displacement device, can compress air for storage. One of the cost reduction methods for CAES systems is to use a PDM in a bidirectional manner for both the compression and expansion processes. However, bidirectional PDMs are often mechanically complicated and tend to operate at high pressure ratios, causing high temperature changes in the system. This can result in a relatively low amount of recovered energy. As a result, there exists a need for an efficient, low-cost, bidirectional (e.g., reversible) compressor/expander for use in a CAES system.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. Moreover, in the drawings, like reference numerals designate corresponding parts throughout the several views.

DETAILED DESCRIPTION

Figure 1:
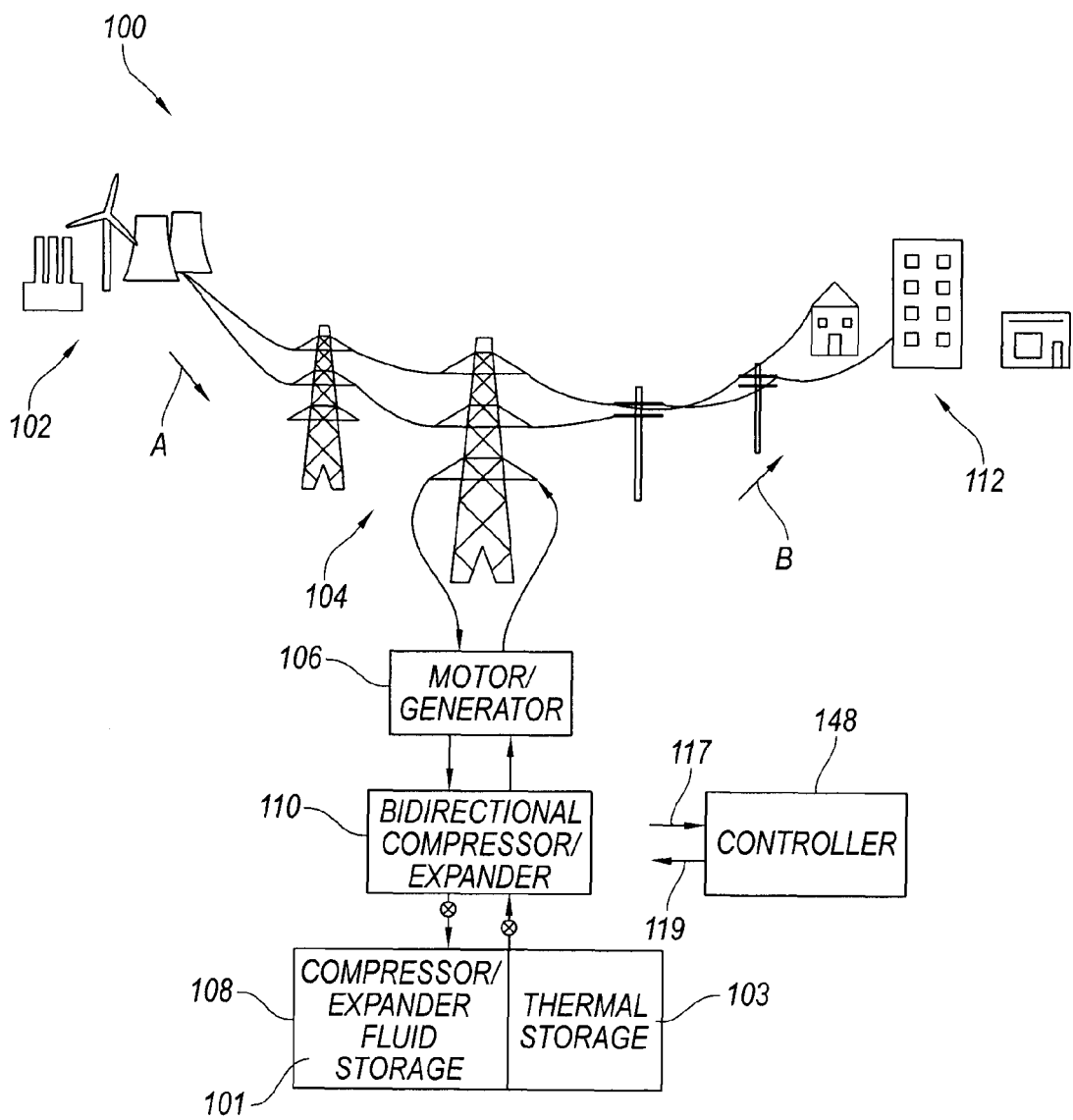
FIG. 1 is a partially schematic illustration of a compressed air energy storage system configured to store and release compressed fluids in accordance with several embodiments of the present disclosure.

The present technology is directed generally to a rotary compressor-expander system for storing and releasing compressed fluids, and associated systems and methods. In at least some contexts, the system includes a pressure-modifying chamber, valveless fluid communication between the chamber and first and second passageways, an integral heat exchanger, and/or a rotor having three or fewer lobes (e.g., two lobes). In several embodiments, the rotor is capable of operating bidirectionally, e.g., in a first configuration or mode in which flow is provided from the first passageway to the second passageway via the chamber, and in a second configuration or mode in which flow is provided from the second passageway to the first passageway via the chamber. In other embodiments, the technology and associated systems and methods can have different configurations, modes, components, and/or procedures. Still other embodiments may eliminate particular components or procedures. A person of ordinary skill in the relevant art, therefore, will understand that the present technology may include other embodiments with additional elements, and/or may include other embodiments without several of the features shown and described below with reference to FIGS. 1-11.

Some or all of the foregoing features have particular applicability and advantages in the context of renewable energy sources. In particular, many renewable energy sources (e.g., solar and wind) provide energy in a manner that varies significantly with time. Combined compressor/expander systems in combination with a suitable reservoir provide an efficient mechanism by which to store energy and release energy at a later time. By improving the efficiency with which such compressor/expander systems operate, aspects of the presently disclosed technology can improve the efficiency with which energy from renewable sources is obtained, stored and used.

Many embodiments of the technology described below may take the form of computer-executable instructions, including routines executed by a programmable computer. Those skilled in the relevant art will appreciate that aspects of the technology can be practiced on computer systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the technology.

Overview

FIG. 1 schematically illustrates a representative overall system 100 for storing energy generated at one time for use at a later time. The overall system 100 can include one or more energy supply sources 102 which supply energy in the direction of arrow A toward an energy storage device (e.g., a reservoir) 108, via electrical lines on a power grid 104. The supplied energy can be generated from a number of suitable sources, including, for example, wind, solar, natural gas, oil, coal, hydro, nuclear, and/or others.

A power device 106 (e.g., a motor, generator or motor/generator) uses energy from the supply source 102 to electrically or mechanically drive a bi-directional compressor/expander 110 to operate in a first configuration or mode. In the first mode, the compressor/expander compresses a fluid, e.g., atmospheric air. Heat generated during compression may be dissipated or retained for later use in an expansion process. After the air has been compressed, the air is directed toward a compressor/expander fluid storage volume 101 of the energy storage device 108.

The energy storage device 108 can include a geological formation, underwater compressed fluid storage vessels, a high-pressure tank, and/or other suitable volume. In some embodiments, the energy storage device 108 is an underwater device as described in U.S. Provisional Patent Application No. 61/309,415, UNDERWATER COMPRESSED AIR ENERGY STORAGE, which has been incorporated by reference herein. In some embodiments, the energy storage device 108 includes the compressor/expander fluid storage volume 101 and a thermal storage volume 103. The compressor/expander fluid storage volume 101 can store working fluid processed by the bi-directional compressor/expander 110. The thermal storage volume 103 can store heated or cooled fluid used by the bi-directional compressor/expander 110 or by other processes or machines.

When energy consumers 112 demand additional energy from the grid 104, the energy storage device 108 can supply compressed air or another fluid to the bidirectional compressor/expander 110 which operates in a second mode to expand the compressed air or other fluid. In some embodiments, heat can be added to the compressor/expander 110 during the expansion process. The heat can be a product of the compression process or can come from another heat source (e.g., a warm liquid reservoir, exhaust from a gas turbine, and/or other suitable sources). Expanding air in the compressor/expander 110 drives the power device 106 to supply electricity to the grid 104 in the direction of arrow B. The electricity is thus provided to the energy consumers 112. The compressor/expander 110 can operate at various speeds based on energy demand and other factors. In some embodiments, for example, the compressor/expander 110 operates at a low speed, producing a low amount of power, but at a high efficiency. In other embodiments, the compressor/expander 110 operates at a higher speed, producing a higher amount of power, at a lower efficiency.

The system 100 can also include a controller 148 that directs the operation of one or more system components, e.g., the power device 106, the compressor/expander 110 and/or the energy storage device 108. Accordingly, the controller 148 can receive inputs 117 (e.g., sensor inputs) and direct outputs 119 (e.g., control signals) via computer implemented instructions. For example, the controller 148 can receive inputs corresponding to energy levels produced by the supply source 102 and demanded by the consumers 112 and, based on the differences between these levels, control the direction of fluid flow through the compressor/expander 110, e.g. to direct fluid through the compressor/expander 110 into the energy storage device 108 when the energy supply exceeds demand, and reverse the fluid flow when demand exceeds supply. In some embodiments the controller 148 can be responsive to operator input or other factors, in addition to or in lieu of responding to supply and demand levels.

Figure 2:
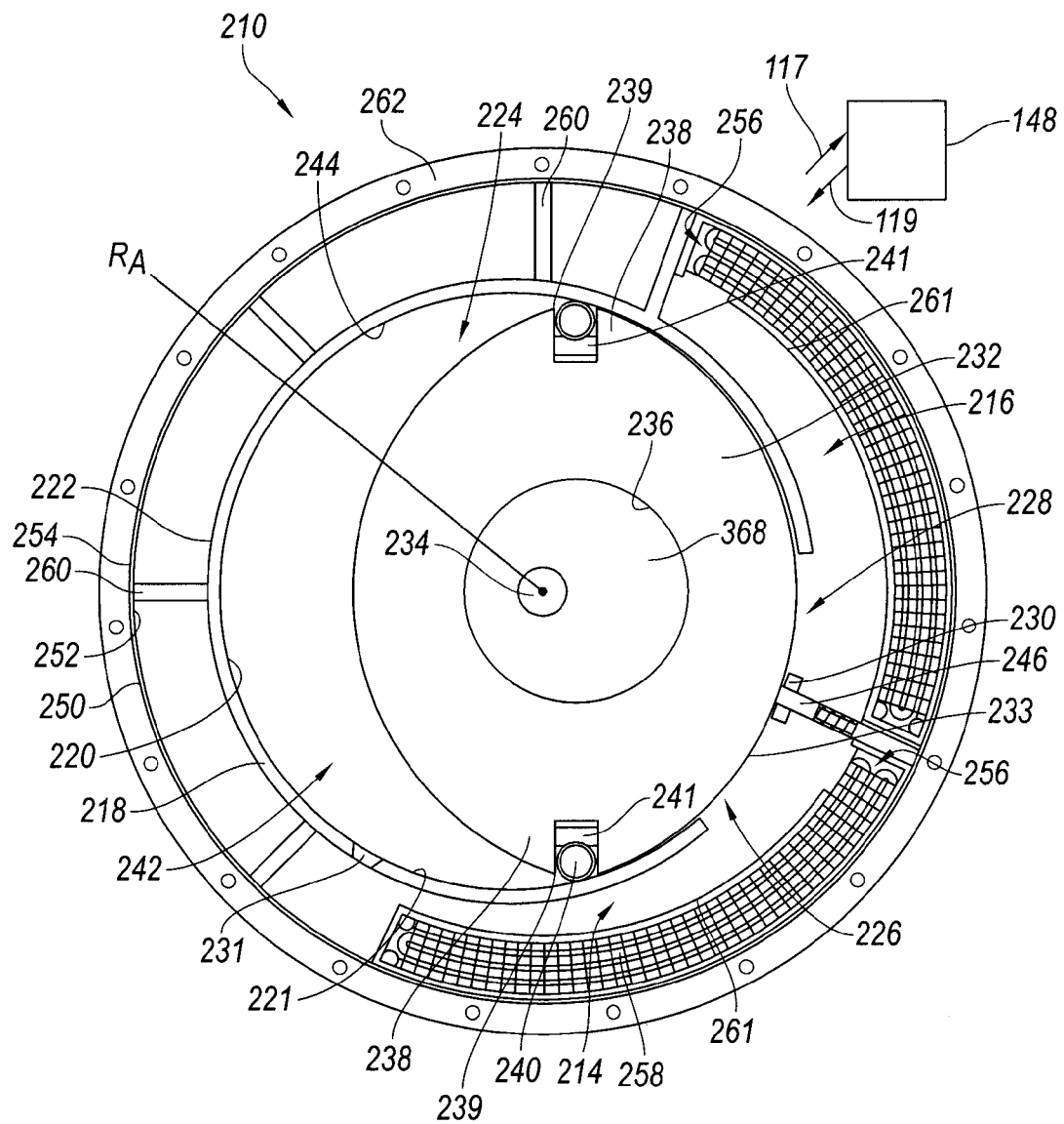
FIG. 2 is a partially schematic front view of a two-lobed rotary displacement system configured in accordance with an embodiment of the disclosure.

FIG. 2 is a partially schematic front view of a two-lobed rotary displacement system 210 configured in accordance with an embodiment of the disclosure. The system 210 can include a first fluid passageway 214, a second fluid passageway 216, and chamber housing 218 having an inner wall 220 and an outer wall 222. The first fluid passageway 214 can have working fluid at a first pressure and the second passageway 216 can have working fluid at a second pressure higher or lower than the first pressure. The chamber housing 218 at least partially surrounds a pressure-modifying chamber 224. In a particular embodiment shown in FIG. 2, the pressure-modifying chamber 224 is generally circular, but in other embodiments can have a modified oval, oblong, trochoidal, or other curved shape. The pressure-modifying chamber 224 can further include a first port 226 connecting the first passageway 214 to the pressure-modifying chamber 224 and a second port 228 connecting the second passageway 216 to the pressure-modifying chamber 224. Accordingly, the first and second ports 226, 228 extend through the chamber housing 218. In several embodiments of the present disclosure, there is no valve between the pressure-modifying chamber 224 and the first passageway 214 and/or between the pressure-modifying chamber 224 and the second passageway 216, as will be discussed in further detail later.

In several embodiments of the disclosure, the system 210 includes a bidirectional compressor/expander, configured to operate as a compressor in a first mode and an expander in a second mode. Depending on the operational mode of the system 210 (e.g., whether it is being run as a compressor or an expander), the first port 226 operates as an inlet port or an outlet port and the second port 228 performs the opposite function, e.g., it operates as an outlet port or an inlet port. For example, in a first mode, in which the system 210 is running as a compressor, the rotor 232 rotates in a first direction, the first port 226 functions as an inlet port (feeding low-pressure working fluid, or flow, into the compression chamber 224), and the second port 228 functions as an outlet port (accepting compressed working fluid and feeding it to the first passageway 214). In the second mode, in which the system is running as an expander, the rotor 232 rotates in a second direction opposite the first direction, the first port 226 operates as an outlet port, the second port 228 operates as an inlet port, and the direction of flow through the system 210 is reversed. In other embodiments, the system 210 operates as a dedicated compressor or expander, and does not run bidirectionally. In particular embodiments, the system 210 can have more than two ports. For example, in some embodiments, the system 210 can have two inlet ports and two outlet ports. The ports 226, 228 can be rectangular with rounded corners or otherwise shaped. The ports 226, 228 are positioned in the chamber housing 218 in manners that differ in different embodiments of the disclosure, as will be described in further detail later. In any of these embodiments, individual ports (e.g., the first port 226 and the second port 228) are separated from each other by a separation portion 230 of the chamber housing 218.

The system 210 can further include a rotor 232 coupled to and eccentrically rotatable relative to a shaft 234 which runs through a center portion 236 of the rotor 232. An eccentric cam 268 is further coupled to the shaft 234 and is positioned in the center portion 236 of the rotor 232. The rotor 232 can have a plurality of lobes 238. While the rotor 232 illustrated in FIG. 2 includes two lobes 238, in other embodiments it can have three or more lobes. The lobes 238 can have various shapes, curvatures, and dimensions in different embodiments of the disclosure. In general, each lobe 238 extends radially outwardly from the center 236 of the rotor 232 by a greater amount than do the neighboring regions of the rotor 232, so that a peripheral boundary 233 of the rotor 232 is non-circular. Each lobe has a tip 239 at the radially-outermost point of the lobe 238. The shaft 234 extends into (e.g., traverses) the chamber 224 along a rotational axis $R_A$ normal to the plane of FIG. 2. The shaft 234 can be electrically and/or mechanically connected to a motor, a generator, or a motor/generator (shown schematically in FIG. 1). The rotor 232 is actuated by rotating the shaft 234 and the cam 268. The rotation direction of the shaft 234 determines the rotation direction of the rotor 232 and whether the system 210 is operating as a compressor or expander. As will be discussed in further detail below with reference to FIG. 3, gears can be added in some embodiments to effect rotor rotation.

In the illustrated embodiment, both the first port 226 and the second port 228 are radially positioned. In other words, the ports 226, 228 are positioned on a surface 221 of the chamber housing 218 that is generally parallel to the rotational axis $R_A$. As the rotor 232 makes orbital revolutions around the shaft 234, the lobe tips 239 rotate past the first and second ports 226, 228 and cyclically cover and uncover the first and second ports 226, 228.

Seals (e.g., tip rollers 240) on the lobes 238 seal the rotor 232 against the inner wall 220 of the chamber housing 218. The tip rollers 240 can be generally cylindrical and are mounted to the lobes 238 via a roller-mount 241, such as a gear-free wheel-and-axle apparatus or a spherical wheel system. The rollers 240 can be forced against the rotor walls in a modulated manner by springs or other pressure devices (e.g., as disclosed in U.S. Pat. No. 3,899,272), to provide low-friction contact with the chamber housing inner wall 220, and can also guide the rotor position. The rollers 240 can also help ensure that pressurized fluid does not escape from a chamber zone 242 bounded by the rotor 232 and the housing inner wall 220. In other embodiments, other tip-sealing features, such as sliding seals, liquid films, and/or a purposefully placed gap space between the lobe 238 and the inner wall 220 of the chamber housing 218 can be used. In one embodiment, for example, a thin film of liquid can be applied to the chamber housing 218 or the lobe tips 239. In some embodiments, the thin film can comprise seawater, freshwater, oil, glycol, glycerin, and/or another material, or a combination of materials. The thin film can provide a higher flow resistance across a gap between the tip 239 and the chamber housing inner wall 220. In other embodiments, air bearings can be applied to the tip 239 to seal the chamber zone 242 with minimal friction. In at least some embodiments, the inner wall 220 of the pressure-modifying chamber 224 and/or portions of the rotor 232 can include one or more low-friction coatings 244. The coating 244 can include plastic, ceramic, or other materials. In low-temperature applications, a low-friction coating (e.g., Teflon, epoxy, polycarbonate, cross-linked polyethylene, and/or other material) can improve the integrity of the seal, while providing relatively low friction between the rotor 232 and the chamber 224 and without incurring the expense of a high temperature seal.

The separation portion 230 between the first port 226 and the second port 228 can carry a seal, e.g., a variable geometry seal 246. The variable geometry seal 246 can engage with the peripheral boundary 233 of the rotor 232 as the rotor 232 eccentrically rotates in the chamber 224. The variable geometry seal 246, in combination with the rotor periphery 233 and rollers 240 contacting the inner wall 220 of the chamber housing 218, divides the chamber 224 into individual chamber zones 242 having individual zone pressures. In the illustrated position, the chamber 224 has only one chamber zone 242 due to the orbital orientation of the rotor 232. Rotating the rotor 232 alters the size and number of the zones 242, as will be discussed in further detail below and with reference to FIGS. 4A-4E.

The orbital position of the rotating rotor 232 with respect to the chamber housing inner wall 220 can determine the size of the chamber zones 242 and the pressure of the fluid within the zones 242. For example, the rotor 232 illustrated in FIG. 2 is oriented in the equivalent of a bottom dead center position. In the compression mode, the rotor 232 rotates in a first rotation direction (e.g., clockwise) about the eccentric shaft 234 to deliver compressed working fluid to a high-pressure passageway (e.g., the second passageway 216). In the expansion mode, the rotor 232 rotates in the opposite direction to deliver expanded working fluid to a low-pressure passageway (e.g., the first passageway 214). As discussed above with reference to FIG. 1, the system 210 can include a controller 148 to control the rotation direction of the rotor 232, which in turn determines whether the system 210 operates to compress or expand. The controller 148 may accordingly receive inputs 117 (e.g., from sensors and/or an operator) and provide outputs 119 to direct the rotor 232. The controller 148 can redirect the rotation of the rotor 232 by mechanical, electrical, electromechanical and/or other suitable devices. For example, in several embodiments the controller 148 controls the rotation direction and torque of the shaft 234. In some embodiments, the controller 148 can perform functions in addition to controlling the bidirectionality of the system 210. In any of these embodiments, the controller 148 can include any suitable computer-readable medium programmed with instructions to direct the operation of the system 210.

The system 210 can further include a heat exchanger 258 positioned outside the chamber housing 218. The heat exchanger 258 can include a heat exchanger passageway 256 in fluid communication with one or more of the first and second passageways 214, 216 and/or the chamber 224. In one embodiment, a heat exchanger housing wall 261 positioned between the heat exchanger passageway 256 and the first and/or second passageways 214, 216 channels flow between the heat exchanger passageway 256 and the first and/or second passageways 214, 216. Flow can be channeled to enhance working fluid contact with the heat exchanger 258. The heat exchanger 258 can be dedicated to providing heating or cooling, or can be bidirectional so as to cool fluid processed by the chamber 224 during compression and add heat during expansion. In other embodiments, fluid is injected directly into the chamber 224 and/or a passageway 214, 216, or 256 by one or more nozzles 231, such as an atomizing spray nozzle. The injected fluid can be colder or hotter than the working fluid in the chamber 224, and can accordingly cool or heat the working fluid in addition to or in lieu of the heat transfer effect provided by the heat exchanger 258. Further aspects of the heat exchanger 258 will be discussed later with reference to FIGS. 6A-6D.

An outer housing 250 can at least partially surround or encase the chamber housing 218, the first passageway 214, and the second passageway 216. The outer housing 250 can have an inwardly facing inner surface 252 and an outwardly facing outer surface 254. The outer housing 250 can be radially spaced apart from the chamber housing 218, providing room for the passageways 214, 216, 256, the heat exchanger 258, stabilizing features 260 (e.g., standoffs), an insulator material (not shown in FIG. 2, but discussed in further detail later with reference to FIG. 7), and/or other components. In FIG. 2, the outer vessel 250 is illustrated as being generally cylindrical, but in other embodiments can be other shapes and/or can only partially surround the chamber housing 218. The outer housing 250 can be axially adjacent to one or more bulkheads 262. In the illustrated embodiment, only one axial bulkhead 262 is shown so as to not obscure the inner-workings of the system 210, but in other embodiments the outer housing 250 can be sandwiched between two axial bulkheads 262. In this manner, the outer housing 250 and the bulkheads 262 can form a pressure vessel for the flow within the system 210. Accordingly, the inner surface 252 of the outer housing 250 and the bulkheads 262 contact and/or contain pressurized flow passing through the system 210. Using the outer housing 250 as a pressure vessel can reduce the material requirements for the overall system 210.

As mentioned above, the inner surface 220 of the chamber housing 218 can have one or more coatings 244 to reduce friction and/or manage wear. The coating 244 can be applied to other surfaces of the system 210 (in addition to or in lieu of the inner surface 220), e.g., other surfaces of the chamber housing 218, the outer housing 250, the rotor 232, the passageways 214, 216, the fluid passageways 256, the heat exchanger 258, the bulkheads 262 and/or the shaft 234, in order to achieve desired functional or material characteristics such as heat resistance or corrosion resistance. For example, when the system 210 is used for combustion engine applications, high-temperature coatings, such as ceramics, can be used to protect the surfaces from hot fluids. In low temperature compressor applications, plastic coatings can be used to improve corrosion resistance and reduce friction at lower cost.

Figure 3:
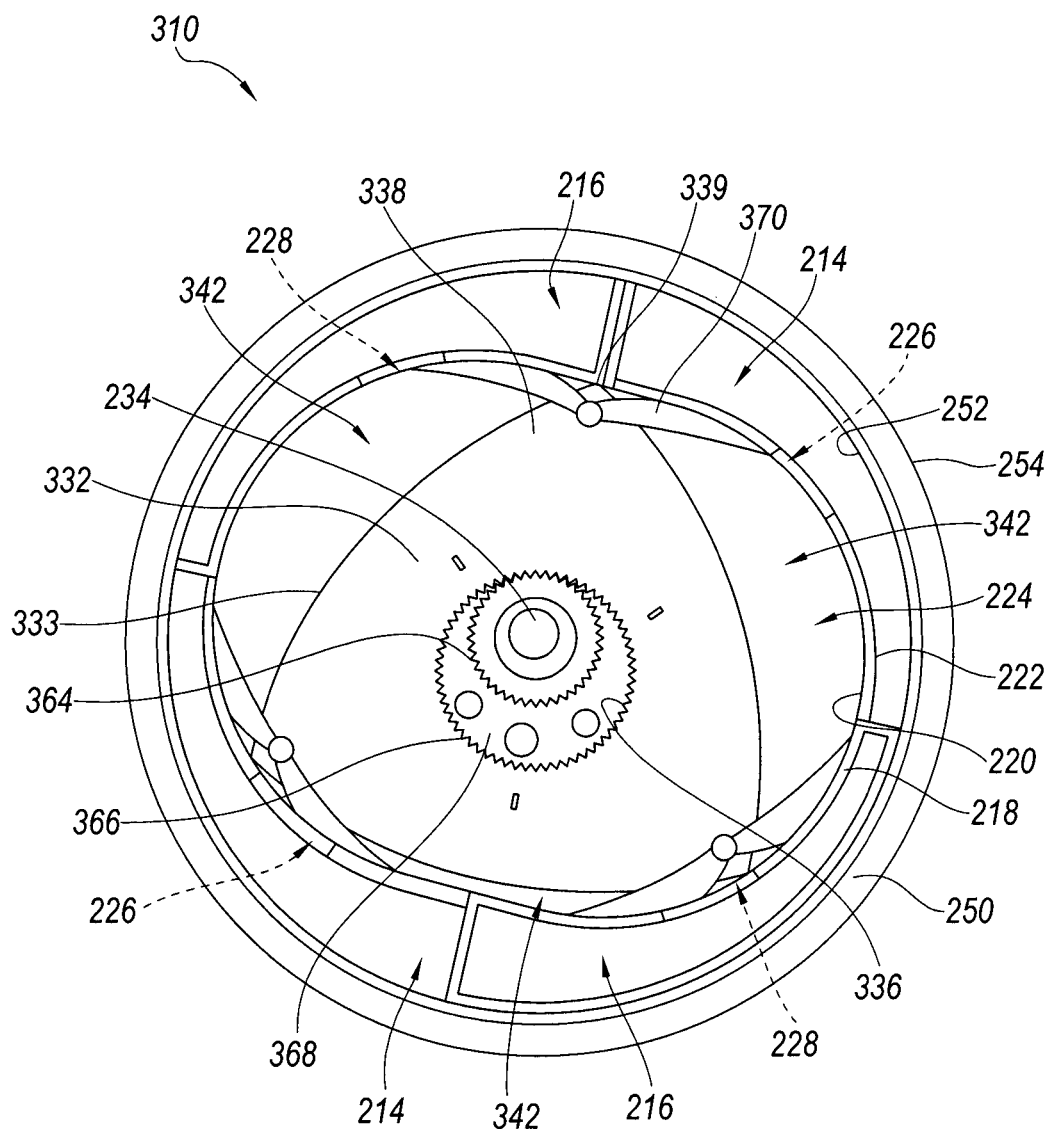
FIG. 3 is a partially schematic front view of a three-lobed rotary displacement system configured in accordance with an embodiment of the disclosure.

FIG. 3 is a partially schematic front view of a three-lobed rotary displacement system 310 configured in accordance with another embodiment of the disclosure. The system 310 includes many features that were discussed above with reference to FIG. 2, including a chamber housing 218 having an inner surface 220 and an outer surface 222, a compression/expansion chamber 224, a rotor 332, a shaft 234, and an outer housing 250 having an inner wall 252 and an outer wall 254. The system 310 further includes first and second passageways 214, 216 and first and second ports 226, 228 connecting the passageways 214, 216 to the chamber 224. In the illustrated embodiment, there are four ports, but in other embodiments the system 310 can include more or fewer ports. In several embodiments, there are no valves in the ports 226, 228 or between the passageways 214, 216 and the chamber 224.

A ring gear 366 (e.g., a planetary gear) is disposed on the inner periphery of a central portion 336 of the rotor 332 and is positioned to mesh with a pinion 364 disposed on the outer periphery of the shaft 234. An eccentric cam 368 is mounted on the shaft 234 and is positioned in the center portion 336 of the rotor 336. The rotor gear 366 meshes with the pinion 264 to eccentrically orbit the rotor 332 around the chamber 224. In other embodiments, other mechanisms, such as the cam described above with reference to FIG. 2, rotate the rotor 332 without the need for gears.

In the illustrated embodiment, the rotor 332 has a rotor periphery 333 that is generally triangular, comprising three curved lobes 338. Each lobe 338 has a tip 339, and each tip 339 has a tip-widener feature 370. In other embodiments, the rotor 332 can have more or fewer than three lobes 338 and the lobes 338 can have different degrees of curvature. The tip wideners 370 radially and circumferentially extend from the lobe tips 339 and contact the inner wall 220 of the chamber housing 218. The wideners 370 divide the chamber 224 into multiple (e.g., three) chamber zones 342. The lobes 338 and tip wideners 370 of the turning rotor 332 cyclically cover and uncover the first and second ports 226, 228. The location of the rotating rotor 332 with respect to the chamber housing inner wall 220 determines the sizes of the chamber zones 342 and the corresponding flow pressures within the zones 342. In some embodiments, the tip wideners 370 can be attached to fewer than every lobe 338 or may be absent altogether. The tip wideners 370 will be discussed in further detail later with reference to FIG. 5.

The preceding overview introduced several systems and methods for efficiently and effectively compressing and expanding fluids in various settings. For example, in an underwater CAES system with high external pressures and high fluid volume, embodiments of bidirectional compressor/expanders with three or fewer lobes and large ports can provide for a high flow of fluid with low fluid friction. The large ports are made possible by various designs and features, e.g., the tip wideners and the variable geometry seals introduced above and described in further detail below.

Several of the systems described above can reduce or minimize operation and/or material costs while improving efficiency. For example, in some embodiments the compressor/expander can be placed in proximity to a large body of water that provides a constant source of heat or cooling energy. Additionally or alternatively, the body of water can provide a repository for water warmed by the compression process. If the warmed water is contained, the warmed water can later be used during the expansion process, using the same heat exchange method used to collect the heat of compression.

Furthermore, the reduced lobe designs generally require less mass and thus less cost for the volume of gas that they compress. Valveless, bidirectional operation of the compressor/expander can offer further efficiency and can reduce device complexity and material costs. The following sections describe several of these features and advantages in more detail and will introduce additional related features and advantages.

Two-Lobed Rotor

Figure 4A:
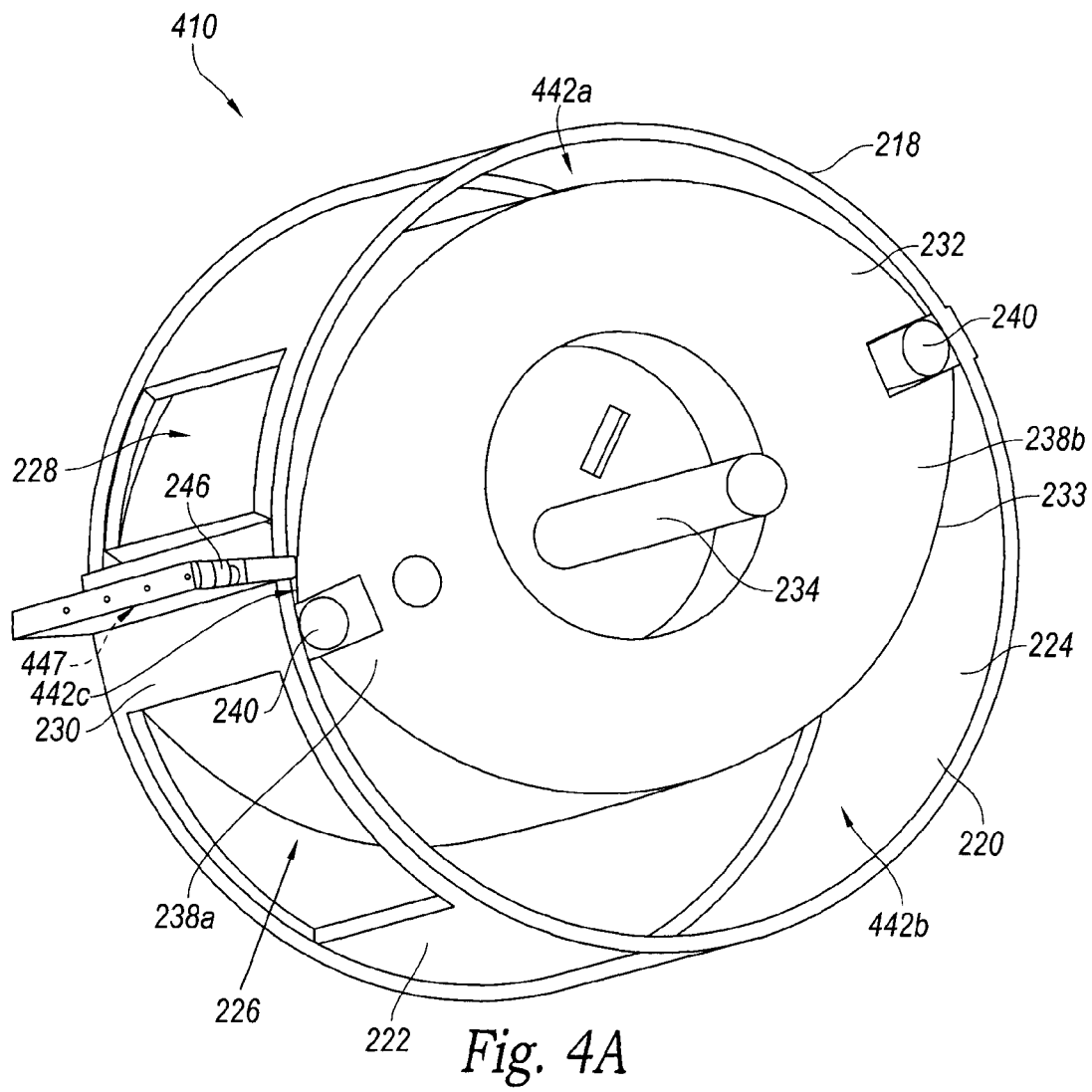
FIG. 4A is a front isometric view of a compressor/expander system configured in accordance with embodiments of the disclosure.

FIG. 4A is a front isometric view of a compressor/expander system 410 configured in accordance with an embodiment of the disclosure. The system 410 includes several features generally similar to those described above with reference to FIGS. 2 and 3. For example, the system 410 includes a rotor 232 carried by and rotatable relative to a shaft 234, with the rotor 232 and the shaft 234 positioned within a pressure-modifying chamber 224 which is at least partially surrounded by chamber housing 218. The rotor comprises two lobes including a first lobe 238a and a second lobe 238b. The chamber housing 218 has an inner wall 220 and an outer wall 222. The chamber 224 includes a first port 226 and a second port 228 which connect the chamber to low- and high-pressure passageways (not shown). In several embodiments, there are no valves in the ports 226, 228 or between the ports and the passageways.

The system 410 can further include a variable geometry seal 246 slideably coupled to a portion 230 of the chamber housing 218 between the first port 226 and the second port 228. The variable geometry seal 246 can include an internal spring 447 to bias the variable geometry seal 246 into engagement with a peripheral boundary 243 of the rotor 232 as the rotor 232 eccentrically rotates in the chamber 224. The variable geometry seal 246 can maintain a continuous sealing engagement with the periphery 233 of the rotor 232 by radially reciprocating between a forward position in which the variable geometry seal 246 extends into the compression/expansion chamber 224 and a retracted or recessed position in which the variable geometry seal 246 is generally flush with an inner wall 220 of the chamber housing 218. In a particular aspect of this embodiment, a first portion of the variable geometry seal 246 can be fixed relative to the chamber housing 218 while a second portion can be radially and/or circumferentially moveable relative to the chamber housing 218. For example, the seal 246 can include a seat that is fixed relative to the chamber housing 218, and a sealing surface that moves (e.g., radially reciprocates) relative to the chamber 218. The variable geometry seal 246, in combination with the rotor 232 pressing against the chamber inner wall 220 (e.g., via the roller 240), creates one or more chamber zones (e.g., three zones) 442 identified individually as zones 442a-442c in FIGS. 4A-4E. In at least some embodiments, the system 410 can include multiple variable geometry seals 246.

The rotor 432 illustrated in FIG. 4A includes tip rollers 240. As discussed above with reference to FIG. 2, the rollers 240 can decrease the friction between the rotor lobes 238 and the inner wall 220 of the chamber housing 218 and between the rotor lobes 238 and the variable geometry seal 246. The rollers 240 can also better enable the rotor 232 to follow the contours of the chamber housing 218.

Figure 4B:
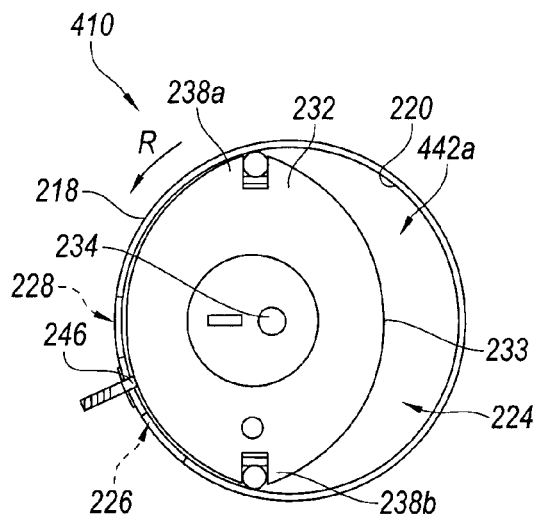
FIGS. 4B-4E are schematic views of the compressor/expander system of FIG. 4A at representative points during operation.
Figure 4C:
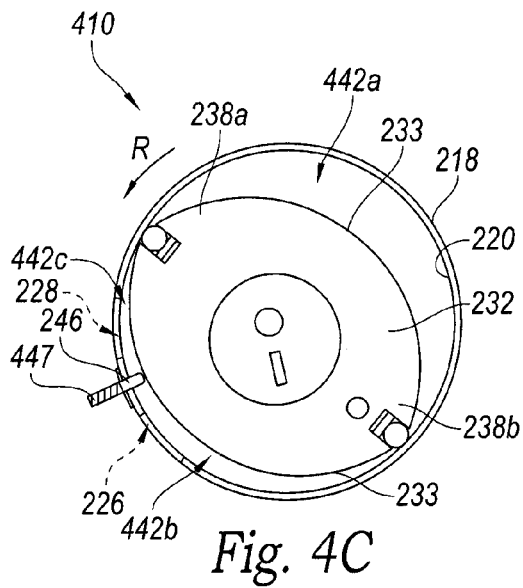

FIGS. 4B-4E are schematic views of the compressor/expander system 410 shown in FIG. 4A, at representative points during operation. Referring first to FIG. 4B, the rotor 232 is positioned to cover the first and second ports 226, 228. A first chamber zone 442a contains a fluid and in this position of the rotor's orbit, the volume of the first zone 442a is maximized. As the rotor 432 turns approximately 45° counter-clockwise as indicated by arrow R and shown in FIG. 4C, low-pressure fluid enters a second zone 442b via the first port 226. The volume of the first zone 442a has decreased, compressing the fluid in the first zone 442a. The spring 447 coupled to the variable geometry seal 246 pushes the variable geometry seal 246 radially inward to remain engaged with the rotor periphery 233.

An interstitial zone 442c is formed between the variable geometry seal 246 and the approaching first lobe 238a. The interstitial zone 442c is filled with high-pressure fluid via the second port 228, but in some embodiments this small volume of fluid will simply discharge from the second port 228 with low losses as the first lobe 238a approaches the variable geometry seal 246. In some embodiments, the system 410 includes grooves (not visible in FIG. 4C) in the inner wall 220 of the chamber housing 218 between the variable geometry seal 246 and the second port 228, thus allowing the interstitial volume 442c to be vented into a high-pressure passageway at any rotor position.

Figure 4D:
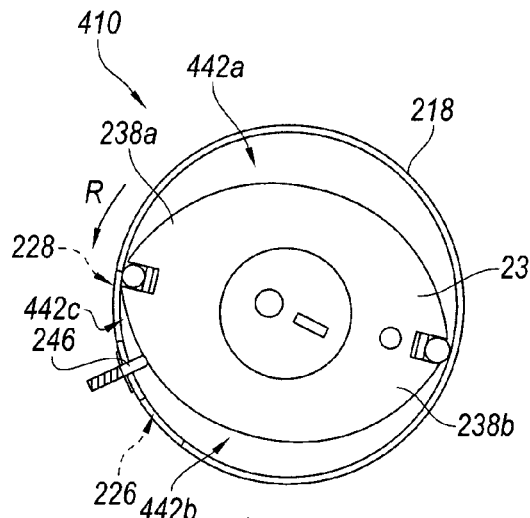

In FIG. 4D, the rotor 232 has continued to rotate in a counterclockwise direction. In this position, the fluid in the first zone 442a has been compressed to the desired pressure ratio and begins discharging into a high-pressure passageway via the second port 228. The first lobe 238a is at the edge of the second port 228. Low-pressure fluid continues to fill the second zone 442b.

Figure 4E:
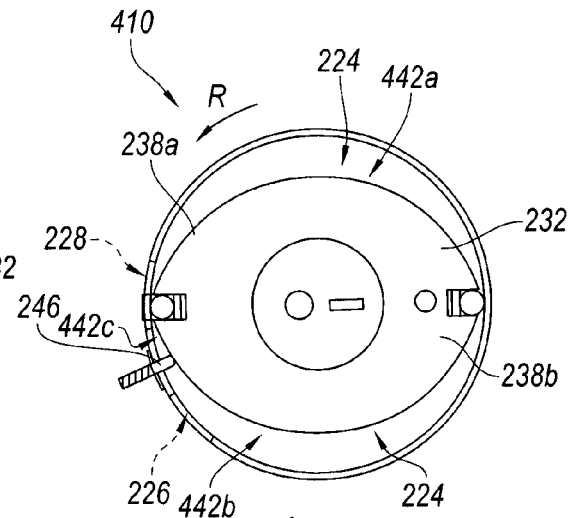

In FIG. 4E, the rotor 232 has continued to rotate counterclockwise and in this position, fluid on one side of the rotor 232 discharges from the chamber 224 while fluid on the other side enters the chamber 224. Specifically, pressurized fluid in the first zone 442a (at a desired pressure ratio relative to the incoming fluid) discharges via the second port 228. Low-pressure fluid continues to fill the second zone 442b. By selecting the size and spacing of the ports 226, 228, the designer can obtain the desired pressure ratio, which can be different for different embodiments of the system. The rotor 232 then continues to rotate to the position shown in FIG. 4B, but now with the second zone 442b filled with fluid and the first and second lobes 238a, 238b in opposite positions.

The foregoing sequence was described in the context of a representative compression mode. It will be understood that the rotor 432 can rotate in the opposite direction to expand the fluid in an expansion mode. As described above, the change between compression and expansion modes can be controlled by the controller 148 (shown schematically in FIG. 2).

One feature of the foregoing arrangement is that the pressure ratio between the ports 226, 228 can be designed to be modest, e.g. on the order of 1.2 in particular embodiments. An advantage of the arrangement is that it reduces the temperature increase during compression, which allows the system to be manufactured with relatively low temperature materials. This in turn can reduce the overall cost of the systems. When it is necessary to compress the fluid by a greater pressure ratio (as is typically the case), the system can include multiple stages arranged in series, as described later with reference to FIG. 6B. Another feature of the foregoing arrangement is that it includes a rotor with only two lobes. An advantage of this feature is that it can allow greater flexibility in positioning and/or sizing the first and second ports. This in turn can facilitate larger ports which can improve the efficiency of the system, as described, further later.

Tip Wideners

Figure 5:
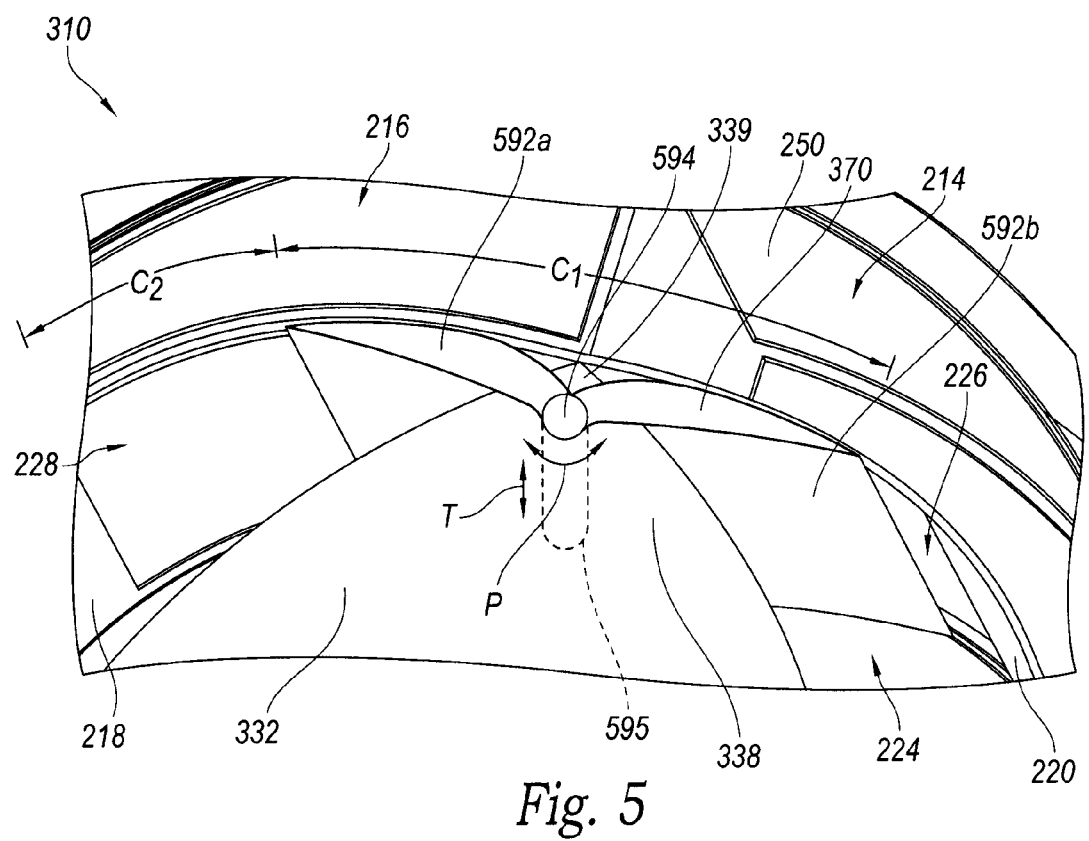
FIG. 5 is an enlarged end view of an upper portion of the system 310 shown in FIG. 3.

FIG. 5 is an enlarged end view of an upper portion of the system 310 shown in FIG. 3. The system 310 has several features generally similar to those described above with reference to FIGS. 2 and 3. For example, the system 310 includes a chamber housing 218 surrounding a pressure-modifying chamber 224. The chamber 224 has a first port 226 and a second port 228 connected to a first passageway 214 and a second passageway 216, respectively. As discussed above, there are no valves between the ports and the passageways in at least some embodiments. The system 310 further includes an outer housing 250 surrounding the pressure-modifying chamber 224 and the passageways 214, 216. A rotor 332 having a lobe 338 with a tip 339 is positioned in the chamber 224. The illustrated portion of the system 310 highlights a tip widener 370 that can be moveably coupled to the lobe tip 339.

The tip widener 370 can include independently flexing arms 592a and 592b that are forced radially outwardly, e.g., by a torsion spring (not visible in FIG. 5) located at an attachment point 594 and/or by the resilient structure of the arms 592a, 592b. The arms 592a, 592b can be independently flexible so as to continuously contact the varying angles along an inner wall 220 of the chamber housing 218 as the rotor 332 rotates. For example, the tip widener 370 can comprise a resiliently bendable, pre-formed material, such as a plastic or spring steel. In other embodiments, the tip widener 370 can have more or fewer than two arms 592a, 592b and can tend radially outwardly under a force other than a spring force. The tip widener 370 can be attached to the lobe 338 by a number of suitable mechanisms, including, for example, welding, frictionally securing, gluing, and/or fasteners.

In still further embodiments, the tip widener 371 can be mounted to the lobe 338 at an attachment point 594 that includes a pivot joint so as to pivot relative to the lobe 338, as indicated by arrow P. In this embodiment, the tip widener 370 can be flexible, as discussed above, or more rigid. If it is more rigid, it can be positioned on a slot 595 so as to translate toward and away from the inner wall 220 (as indicated by arrow T) as it pivots.

The tip widener 370 can have a circumferential extent $C_1$ that is larger than a circumferential extent $C_2$ of the first and second ports 226, 228. In other words, when the tip widener 370 is positioned over an individual port, the tip widener arms 592a, 592b effectively seal the port from fluid communication with the chamber 224. Accordingly, the tip wideners 370 can decrease the circumferential spacing required between the input and output ports 226, 228. Using the three-lobed rotor 332 as an example, the spacing between conventional lobe tips is approximately 120°, resulting in ports that need to be fairly evenly spaced around the circumference of the housing. However, the tip widener 370 allows the ports 226, 228 to be placed at points less than 120° apart, in effect increasing the circumferential spread of the lobe 338. This flexibility of port placement allows for greater displacement efficiency of the device 310. The circumferential extent $C_1$ of the tip widener 370 can vary depending on the number and spacing of the ports 226, 228 and the desired timing of port openings and closings. The circumferential extent $C_1$ of the tip widener 370 can vary to provide the desired circumferential space between lobes 338. For example, in one embodiment having four ports, three lobes, and a pressure ratio of 1.4, the circumferential extent between each proximate pair of high pressure and low pressure ports can be approximately 89°, the circumferential extent between tip wideners can be approximately 51°, the opening sizes of the low pressure ports can be approximately 28°, and the opening sizes of the high pressure port can be approximately 17.5°.

Both the tip wideners and the variable geometry seals can significantly reduce reverse flow conditions while still accommodating large port sizes. For example, the tip wideners can reduce or minimize reverse flow by effectively narrowing the effective circumferential spacing between ports along the inner wall of the chamber. Likewise, variable geometry seals dynamically separate high- and low-pressure sides of the chamber, reducing the chance that high- and low-pressure ports will be simultaneously open within a single zone. By reducing reverse flow conditions and accommodating large ports, the system can benefit from reduced tip bypass flow and allows port opening and closing timing to be optimized, thereby improving system efficiency. While these features were described above in the context of a three-lobed rotor, they can be applied alone or in combination to a two-lobed rotor.

Large Ports

As discussed above, several embodiments of the disclosed systems include port sizes that are significantly larger than existing ports without creating overly large reverse flow conditions. For example, in various representative two lobe design arrangements with pressures ratios from about 8 to about 1.2, ports can be sized to be from about 3% to about 15% or more of the circumference of the chamber inner surface without the system encountering large reverse flow conditions during operation. In various representative three lobe arrangements with pressure ratios from about 8 to about 1.2, ports can be sized to be from about 4% to about 15% of the circumference of the chamber inner surface without encountering large reverse flow conditions in operation. These large ports can be enabled by the variable geometry seal and/or the tip widening features.

Integral Heat Exchanger

Figure 6A:
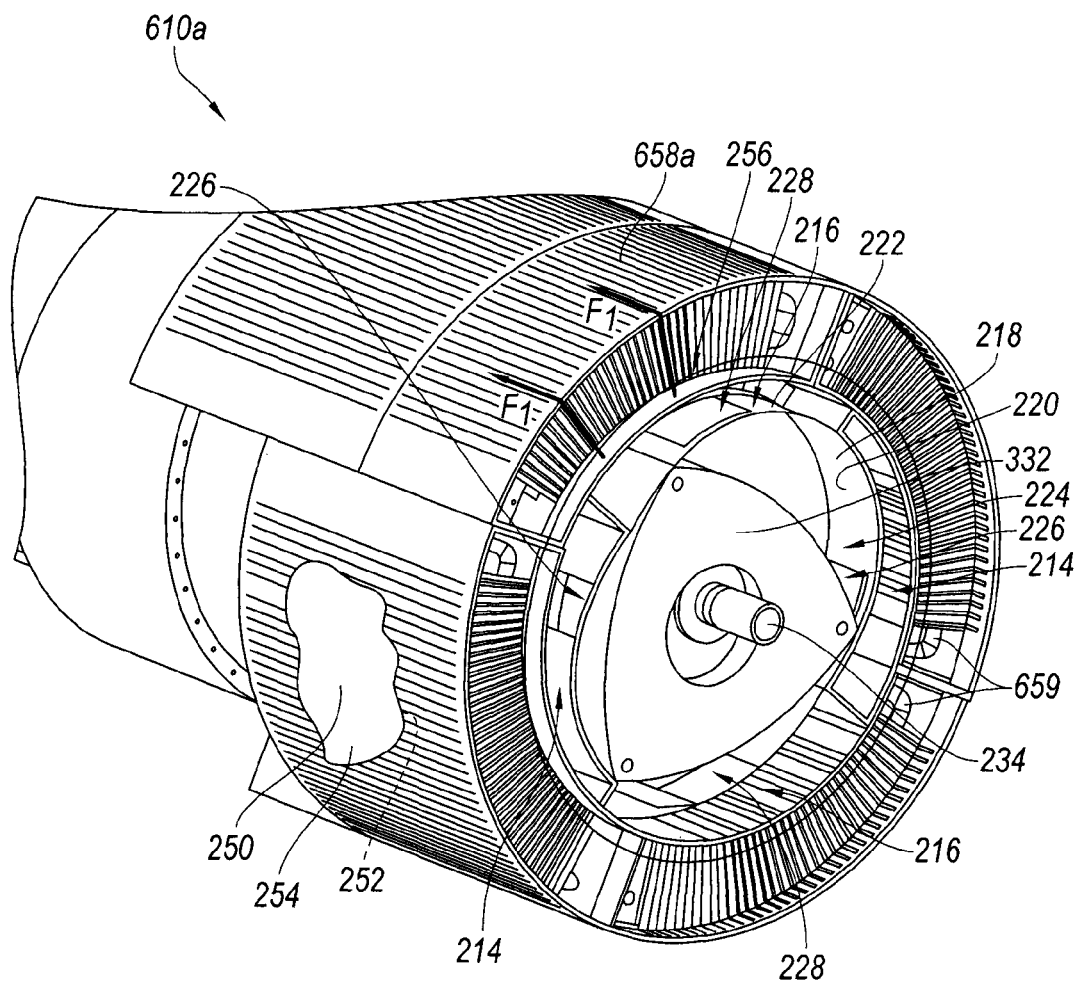
FIG. 6A is a partially schematic isometric view of a rotary displacement system having an integral heat exchanger configured in accordance with an embodiment of the disclosure.

FIG. 6A is a partially schematic isometric view of a rotary displacement system 610a having an integral heat exchanger 658a configured in accordance with an embodiment of the disclosure. The system 610a includes several features generally similar to those described above with reference to FIGS. 2 and 3. For example, the system 610a includes a chamber housing 218 having an inner wall 220 and an outer wall 222, a pressure-modifying chamber 224, a rotor 332 rotatably coupled to a shaft 234, first and second passageways 214, 216, and first and second ports 226, 228 in the chamber 224 providing fluid communication between the chamber 224 and the individual passageways 214, 216.

The heat exchanger 658a is positioned radially outside the chamber housing 218 and the passageways 214, 216. The heat exchanger 658a includes one or more heat exchanger supply tubes 659 which convey a heated or cooled heat exchanger fluid. In the illustrated embodiment, the heat exchanger 658a surrounds a portion of the chamber housing 218 and is in fluid communication with working fluid from the pressure-modifying chamber 224. Specifically, working fluid exiting the chamber 224 via the second port 228 flows radially outwardly in the direction of arrows $F_1$ through the second passageway 216, and into a heat exchanger passageway 256 to make contact with the heat exchanger 658a. The working fluid exchanges heat with the heated or cooled heat exchanger fluid in the supply tube 659.

The system further comprises an outer housing 250 (a portion of which is shown in FIG. 6A) having an inner surface 252 and an outer surface 254. The outer housing 250 can at least partially surround and/or encase the chamber housing 218, the pressure-modifying chamber 224, the passageways 214, 216, and the heat exchanger 658a. In several embodiments, pressurized working fluid passing through the heat exchanger 658a contacts the inner surface 252 of the outer housing 250, which acts as a pressure vessel to contain the working fluid. Using the interior of the outer housing 250 as a pressure vessel eliminates the need for several pipe-fittings and passageways between the pressure-modifying chamber 224 and the ports 226, 228, the passageways 214, 216, and the heat exchanger 658a, and between one stage and the next in multi-stage systems.

The heat exchanger 658a illustrated in FIG. 6A is a finned-tube heat exchanger. Other embodiments can include other types of heat exchangers such as shell-and-tube heat exchangers, plate heat exchangers, gas-to-gas heat exchangers, direct contact heat exchangers, fluid heat exchangers, phase-change heat exchangers, waste heat recovery units, or other types of heat exchangers. For example, in some embodiments, the heat exchanger 658a can comprise a waste heat recovery unit (not shown) that transfers heat from a hot gas stream to the heat exchange fluid. The hot gas stream can be an exhaust gas stream from a gas turbine or a diesel engine, or a waste gas stream from a refinery, or other industrial system.

The heat exchanger fluid can comprise freshwater, seawater, steam, coolant, oil, or other suitable gaseous liquid and/or biphasic fluids. The heat exchanger 658a can operate in both the compression and expansion modes to support a bidirectional compressor/expander, and may interact with the compressed/expanded flow before or after the flow enters the chamber 224. In some embodiments, the heat exchanger fluid is the same for both the compression and expansion modes of operation of the device, while in other embodiments different heat exchanger fluids are used. In some embodiments, heat exchanger fluid that is heated during operation in the compression mode can be stored, e.g., in an exterior thermal storage reservoir for use during operation in the expansion stage. The heat exchanger 658a can be made of a number of suitable materials or combinations of materials, including metals, ceramics, or plastics. In several embodiments, the heat exchanger is at least partially made of corrosion-resistant materials (e.g. copper, cupro-nickel, titanium, stainless steel and others) in order to allow for the use of a wide variety of heat exchange fluids.

As will be discussed in further detail below with reference to FIG. 6B, multiple pressure-modifying chambers 224 (e.g., stages) can be fluidly connected and can operate in series. In some multi-stage embodiments, the radial heat exchanger 658a axially extends along the outer wall 222 of multiple chamber housings 218. In such an embodiment, the compressed/expanded working fluid travels radially outwardly from a first port 228 of a first stage (as indicated by arrows $F_1$), into the heat exchanger 658a, axially along the heat exchanger 658a, and then radially inwardly to enter a second port of a second pressure-modifying chamber (not shown). When the system operates in the compression mode, the working fluid can be cooled between stages. When the system operates in the expansion mode, the working fluid can be heated between stages. Interstage heating and cooling can reduce (e.g., minimize) the temperature changes between stages that can rob the system 610a of operating efficiency. By directing the working fluid in the passageways 214, 216 radially outwardly from the chamber housing 218 the system can reduce pressure oscillations between stages and allow for significant heat exchanger length.

Figure 6B:
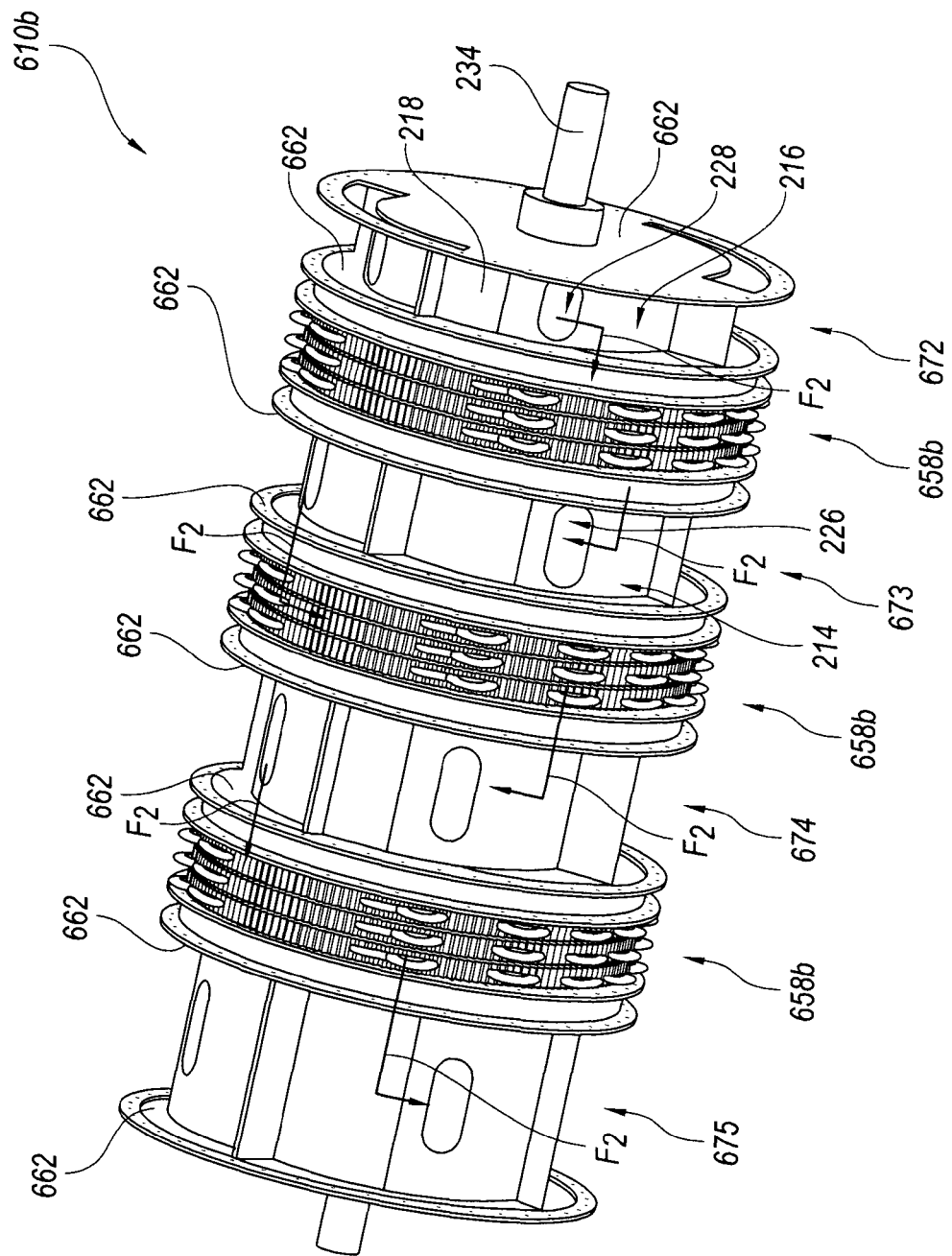
FIG. 6B is a partially schematic, isometric side view of a multi-stage rotary displacement system having an integral heat exchanger configured in accordance with another embodiment of the disclosure.

FIG. 6B is a partially schematic, isometric side view of a multi-stage rotary displacement system 610b having multiple integral heat exchangers 658b in accordance with another embodiment of the disclosure. The system 610b includes multiple stages (numbered individually as stages 672-675) axially aligned along a shaft 234. For purposes of clarity, the rotors carried by the shaft 234 are not shown in FIG. 6B. Each stage can include a chamber housing 218 having first and second ports 226, 228, a first passageway 214, and a second passageway 216. Each stage 672-675 can additionally include one or more bulkheads 662 positioned axially adjacent to the corresponding chamber housing 218.

The system 610b further includes multiple axial heat exchangers 658b axially aligned between compression/expansion stages 672-675. The heat exchangers 658b are in fluid communication with working fluid in the first and/or second passageways 214, 216. Specifically, the working fluid travels from one stage to the next in the direction of arrows $F_2$. For example, the working fluid can exit a first stage 672 through a corresponding second port 228 and then flow axially into an axially adjacent heat exchanger 658b. The working fluid then enters the first port 226 of the adjacent stage 673 and the process is repeated as the working fluid travels from right to left in FIG. 6B. In some embodiments, the working fluid travels directly from the second passageway 216 into the heat exchanger 658b and in other embodiments the working fluid traverses through one or more apertures in the adjacent bulkhead 662 (discussed in further detail below with reference to FIG. 6C) and then into the adjacent heat exchanger 658b. The working fluid transfers thermal energy in the heat exchanger 658b and continues axially into the first passageway 214 and first port 226 of the adjacent second stage 673. The first port 226 and second port 228 of sequential stages may be offset clockwise or counterclockwise relative to each other in order to better direct the working fluid through the system 610b.

Like the radial heat exchanger 658a discussed above with reference to FIG. 6A, the axial heat exchanger 658b can operate in both compression and expansion modes to support a bidirectional compressor/expander. Any of the types of heat exchangers and heat exchanger fluids described above can be used in the axial heat exchanger 658b as well. While three heat exchangers 658b and four compression/expansion stages 672-675 are illustrated in FIG. 6B, other embodiments can include more or fewer stages and/or heat exchangers 658b, and the arrangement of the stages 672-675 and heat exchangers 658b can vary. For example, a multi-staged design can be used in systems not having an integral heat exchanger. Furthermore, the axial length of the compression/expansion stages 672-675 and the heat exchangers can vary within a system 610b. For example, differing axial lengths can be used to maintain generally consistent pressure ratios from one stage to the next due to the changing density of the working fluid from stage to stage.

Figure 6C:
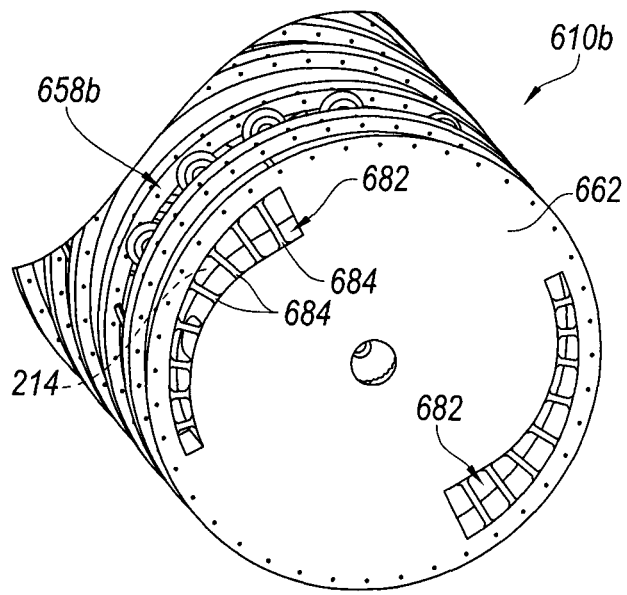
FIG. 6C is a partially schematic isometric end view of an interior portion of the system of FIG. 6B.

Referring now to FIG. 6C, the system 610b can further include perforated bulkheads 662 having reinforcing ribs 684. An individual bulkhead 662 includes one or more apertures 682 that allows the working fluid to flow into the passageways and corresponding chamber ports of an adjacent stage. In embodiments for which the outer housing and bulkheads 662 act as a pressure vessel for the working fluid passing through the system 610b, the bulkheads 662 can experience a significant bending force from the internal pressure, particularly around the apertures 682 located near the periphery of the bulkhead 662 where the bulkhead 662 is coupled to the outer housing. Accordingly, the reinforcing ribs 684 can be welded or otherwise affixed across the apertures 682 to prevent or limit bulkhead deformation due to internal pressure, while still allowing fluid flow to the internal heat exchanger 658b. While the reinforced ribs 684 are illustrated on a system 610b having an axial heat exchanger 658b, they can be used in embodiments having a radial heat exchanger (e.g., the heat exchanger 658a shown in FIG. 6A) or in embodiments having no heat exchanger.

Figure 6D:
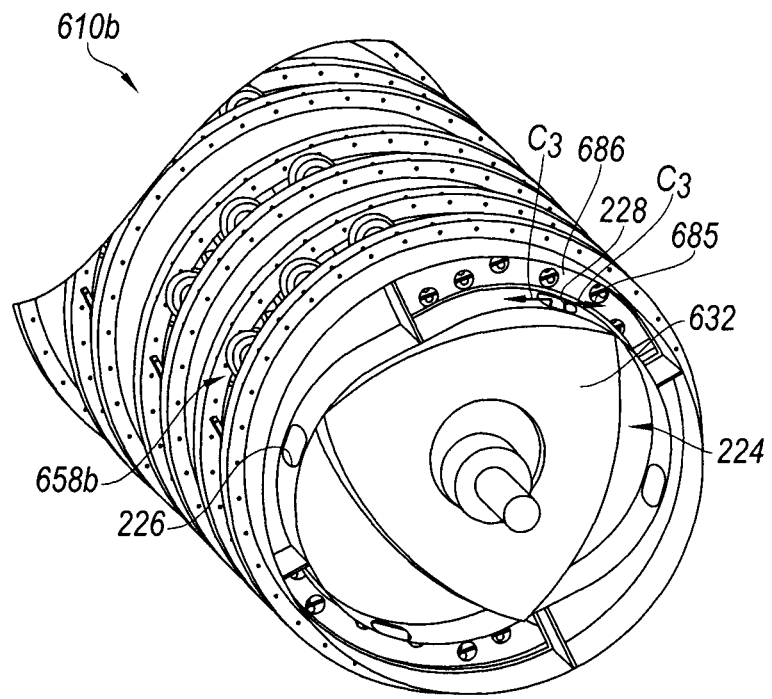
FIG. 6D is a partially schematic isometric end view of the system of FIG. 6B.

Turning now to FIG. 6D, the system 610b can further include a distribution plate 686 positioned between an individual pressure-modifying chamber 224 and the adjacent heat exchanger 658b. The distribution plate 686 can span all or a portion of the pressure-modifying chamber 224 and can include a plurality of openings 685. The distribution plate 686 is positioned to disseminate working fluid over the heat exchanger 658b more effectively. Specifically, as the working fluid exits the second port 228 in a radial direction, it passes circumferentially around the outside of the chamber 224, as indicated by arrows $C_3$ and then axially through the openings 685 and through the heat exchanger 658b. In various embodiments, the openings 685 on the distribution plate 686 can have different sizes and shapes, the distribution plate 686 can have more or fewer openings 685, and/or the openings 685 can be arranged in other configurations. The plate 686 can accommodate working fluid flowing in either direction, as appropriate for a bidirectional compressor/expander system. While the distribution plate 686 is illustrated in the context of a system 610b having an axial heat exchanger 658b, an analogous plate can be used with a radial heat exchanger similar to that depicted in FIG. 6A. For example, the distribution plate 686 can be curved to match the curve of the heat exchanger, and can be positioned radially between a passageway and a corresponding radial heat exchanger. Furthermore, while the rotor 332 is illustrated as a three-lobed rotor 332, in other embodiments integral heat exchanger designs and/or multi-stage designs can be used with rotors having more or fewer (e.g., two) rotor lobes.

Radial and axial heat exchangers can be used separately or in combination in rotary displacement systems. Dimensional characteristics can influence which type of integral heat exchanger to use in a particular system. For example, axial heat exchangers provide for narrow, lengthened, systems while radial heat exchangers provide for wider, but shorter systems which require fewer inter-stage bulkheads (as two adjacent stages can share a common divider bulkhead). Regardless of what type of heat exchanger is chosen, integrating the heat exchanger into the device can provide for more constant temperature operation of the rotary displacement device. In bidirectional systems, the integral heat exchanger allows for efficient restoration of the heat produced during compression to the expansion cycle. In compressed air energy storage applications, the use of integral heat exchangers can significantly improve the round-trip energy efficiency of air between the compressor/expander and the energy storage system and can reduce operating costs by reducing or eliminating the natural gas typically required to add heat during the expansion process.

Fluid injection can additionally or alternatively be used to exchange heat in rotary displacement devices. As introduced with reference to FIG. 2, fluid injection comprises introducing an injection fluid (typically a liquid) to the pressure-modifying chamber 224 to cause a thermal transfer between the fluid and the flow within the chamber 224. In some embodiments, the injection fluid can include seawater, fresh water, oils (such as vegetable oil or mineral oil), or refrigerants such as a fluorocarbon. The selection of injection fluid can depend on a number of injection fluid characteristics, including, for example, the injection fluid's surface tension, specific heat, heat transfer coefficient, costs to atomize the injection fluid, lubricative properties, and environmental friendliness. In several embodiments, the injection fluid is non-combustible and/or is specifically selected to be injected into chamber 224 or other region without combusting.

In various embodiments, the fluid can be introduced via the first port 226, via one or more separate fluid-delivery ports in the chamber housing, and/or via one or more fluid ports in the rotor (discussed in further detail below with reference to FIG. 8). In other embodiments, the injection fluid is introduced in the first or second passageways 214, 216 or in the heat exchanger passageway 256. In still further embodiments, injection fluid is introduced from multiple locations to provide more even injection fluid distribution into the pressure-varied fluid. In several embodiments, the injection fluid is introduced via a nozzle (shown schematically in FIG. 2) such as an atomizing spray nozzle. In some embodiments, the injection fluid is atomized to increase surface area and injection fluid suspension in the working fluid. In one embodiment, for example, the injection fluid is about 500 microns or smaller. In a particular embodiment, the injection fluid is atomized to be sized from about 20 to about 100 microns. Upon injection, the injection fluid can absorb heat of compression or can provide heat for expansion by direct contact with the working fluid in the chamber. In some embodiments, the heat exchange injection fluid may be injected into the gas stream prior to either expansion or compression, or the gas stream may be allowed to percolate through the heat exchange fluid. In some embodiments, feedback from one or more temperature sensors monitoring either the working fluid or injection fluid output temperature can be used by the controller, possibly along with information about the thermal energy storage and other parameters, to adjust the quantity of liquid and the method of injection to achieve various objectives which may include a high efficiency of operation or a desired temperature range.

The injection fluid can be extracted via the discharge port 228 with the pressure-modified fluid or it can be separately extracted with various mechanisms such as sump-like devices, condensation (such as condensation off a heat exchanger 658a or 658b), centrifugal separation, or baffle plates in passageways 214, 216, 256. Upon extraction, the heat-exchange liquid can be stored in a thermal reservoir. In some embodiments the injection fluid may go through a liquid-to-liquid heat exchanger which will either extract heat from the fluid after compression or provide heat to the fluid prior to expansion. Depending on the desired operating conditions and the relative mass flow and specific heat of the liquid, liquid injection may eliminate or reduce the need for a separate heat exchange mechanism. Fluid injection heat exchange can be inexpensive and can allow for closer approach temperatures between the working fluid and the injection fluid. A number of liquids can be used for liquid injection heat exchange, including any of those mentioned above with reference to FIGS. 6A-6D. Additionally, in some embodiments, fog (e.g., a suspension of liquid droplets or condensed vapor) can be used as the heat exchange fluid.

One feature of the foregoing heat exchangers is that they can re-use heat generated at one location in the system and/or during one mode of operation in another portion of the system and/or during another mode of operation. This arrangement can enhance the overall thermodynamic efficiency of the system and can thereby reduce the cost of operating the system. In particular embodiments, the heat can be exchanged between the rotary displacement device and the ambient environment, or a separate thermal reservoir, or both. Generally, the greater the temperature rise permitted in the exchange fluid, the greater the advantage of storing the heat for later retrieval.

Insulation

Figure 7:
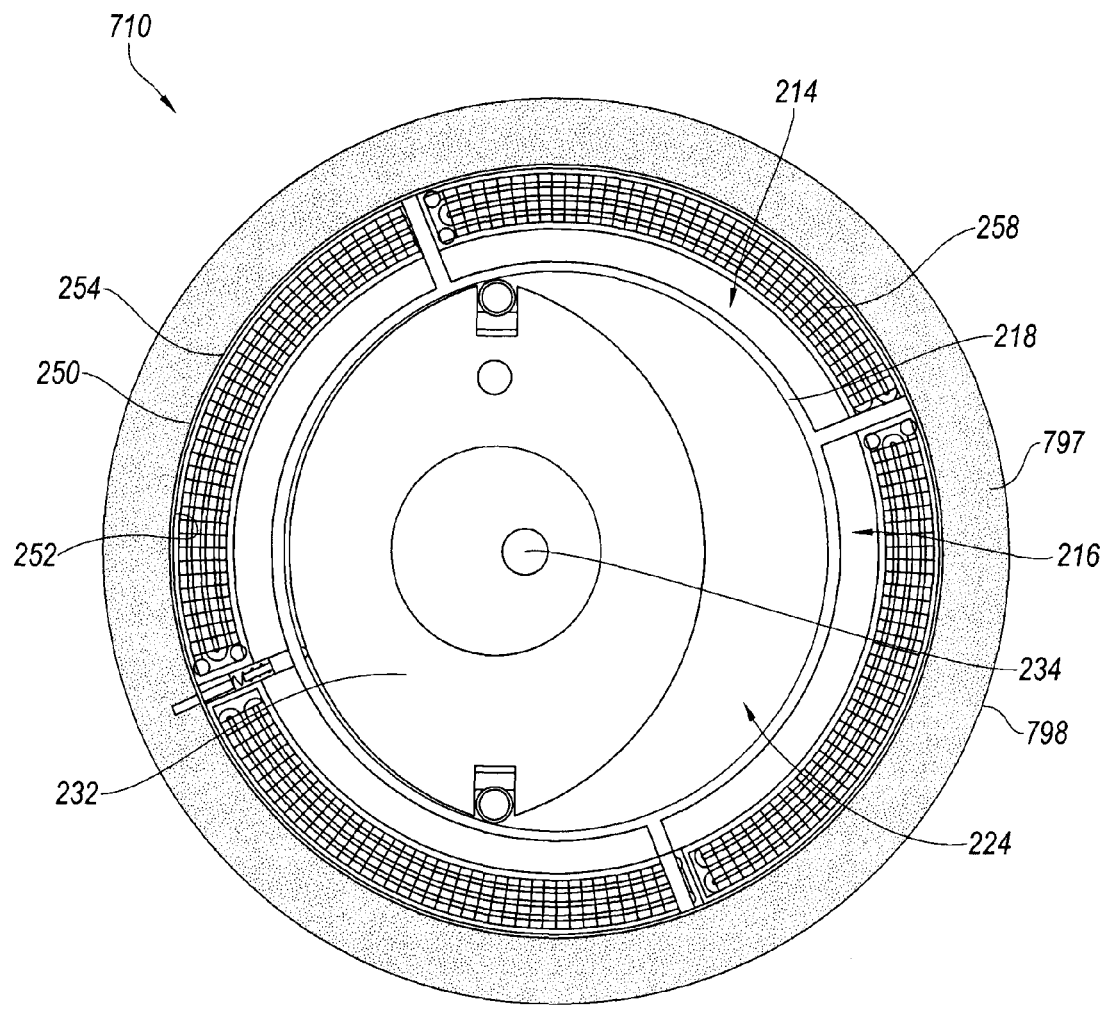
FIG. 7 is a front view of a rotary displacement system having an insulator configured in accordance with an embodiment of the disclosure.

FIG. 7 is a front view of a rotary displacement system 710 having an insulator 798 configured in accordance with an embodiment of the disclosure. The system 710 includes several features generally similar to those described above with reference to FIGS. 2 and 3. For example, the system 710 includes a chamber housing 218 having a first passageway 214 and a second passageway 216 and surrounding a pressure-modifying chamber 224 and a rotor 232 carried by and rotatable relative to a shaft 234. The system also includes a heat exchanger 258 and an outer housing 250 having an inner surface 252 and an outer surface 254.

In a particular embodiment, the insulator 798 is positioned radially outside the outer housing 250. In the illustrated embodiment, the insulator 798 circumferentially contacts and surrounds the outer surface 254 of the outer housing 250, but in other embodiments may surround only a portion of the outer housing 250. In other embodiments, the insulator 798 can be internal to the outer housing 250 and can contact the inner surface 252 of the outer housing 250. In still further embodiments, the insulator 798 can contact the chamber housing 224, the heat exchanger 258, and/or a passageway 214, 216 and the outer housing can be absent or radially outward of the insulator 798. The insulator 798 can include an outer shell that is spaced apart from the outer housing by an air gap or, as illustrated, the gap can be filled with a suitable insulating filler material 797. In some embodiments, the filler material 797 can be fiberglass filler or other materials. In other embodiments, the gap can be evacuated to provide an insulating effect. In any of these embodiments, the insulator 798 can contribute to maintaining fluid temperatures within the system 710, particularly within the integral heat exchanger 258.

Hollow Rotor

Figure 8:
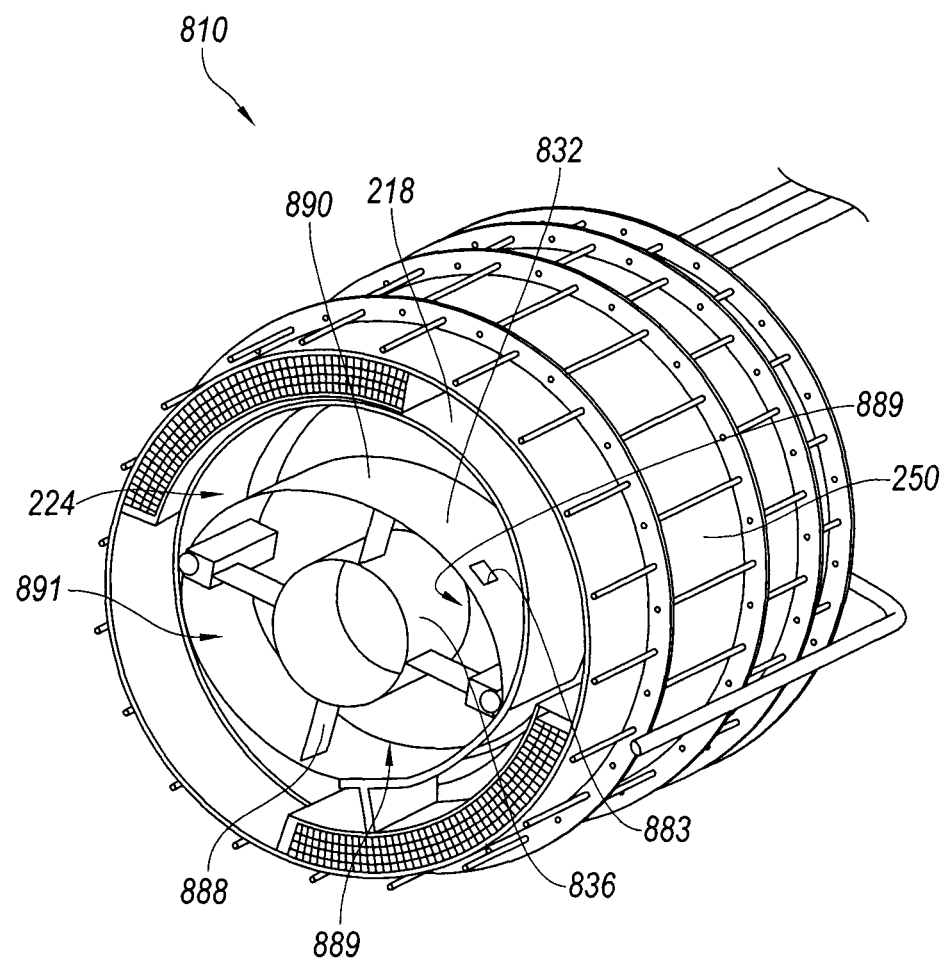
FIG. 8 is a partially schematic isometric view of a rotary displacement system having a generally hollow rotor configured in accordance with an embodiment of the disclosure.

FIG. 8 is a partially schematic isometric view of a rotary displacement system 810 having a generally hollow rotor 832 configured in accordance with an embodiment of the disclosure. The system 810 includes several features generally similar to those described above with reference to FIGS. 2 and 3. For example, the system 810 includes an outer housing 250, a chamber housing 218, and a pressure-modifying chamber 224.

In the illustrated embodiment, an end surface of the rotor 832 is cut away to illustrate that the rotor 832 has a generally hollow interior portion 891 framed by rotor walls 890. In some embodiments, for example, only a small portion of the volume of the rotor 832 comprises rotor walls 890, leaving the rest of the rotor 832 at least partially, and in some embodiments predominantly, hollow. In one embodiment, for example, the rotor walls 890 comprise five percent or less of the rotor volume. In some embodiments, the rotor walls 890 can be locally thickened to balance the rotor as it spins. In other embodiments, the rotor walls 890 may be made of more than one layer of material stiffened with a honeycomb structure or filler separating the layers.

The rotor 832 can include various internal features. In one embodiment, the rotor interior 891 includes a stiffening structure 888 to add support to the rotor 832 structure. The stiffening structure 888 can also include a center structure 836 for mating with the shaft and cam. For example, as discussed above with reference to FIG. 3, the center structure 836 can support the ring gear 366. The rotor 832 can additionally or alternately include internal cavities 889. In one embodiment, an internal cavity 889 is filled with filler material to achieve a desired rotor 832 weight. In another embodiment, as described above with reference to FIG. 6, the internal cavity 889 comprises an internal fluid passageway and an output port 883 for supplying heat injection fluid to the pressure-modifying chamber 224 as a method of heat exchange.

In some embodiments, the rotor 832 can be cast or fabricated from plate materials. For example, in one embodiment, the rotor 832 can be fabricated from cut, formed, and welded plate materials. While the rotor 832 illustrated in FIG. 8 is a two-lobed rotor 832, in other embodiments the rotor 832 can have three or more lobes.

One feature of the hollow rotor 832 is that is can be easily fabricated, inexpensive, and lightweight. Accordingly, the hollow rotor 832 can reduce the cost and complexity of the system in which it is installed. Another feature of the hollow rotor 832 is that it can reduce eccentric loading on the shaft due to inertial accelerations. Accordingly, it can reduce fatigue loads and therefore increase the life of the systems in which it is installed.

Parallel Rotors

Figure 9:
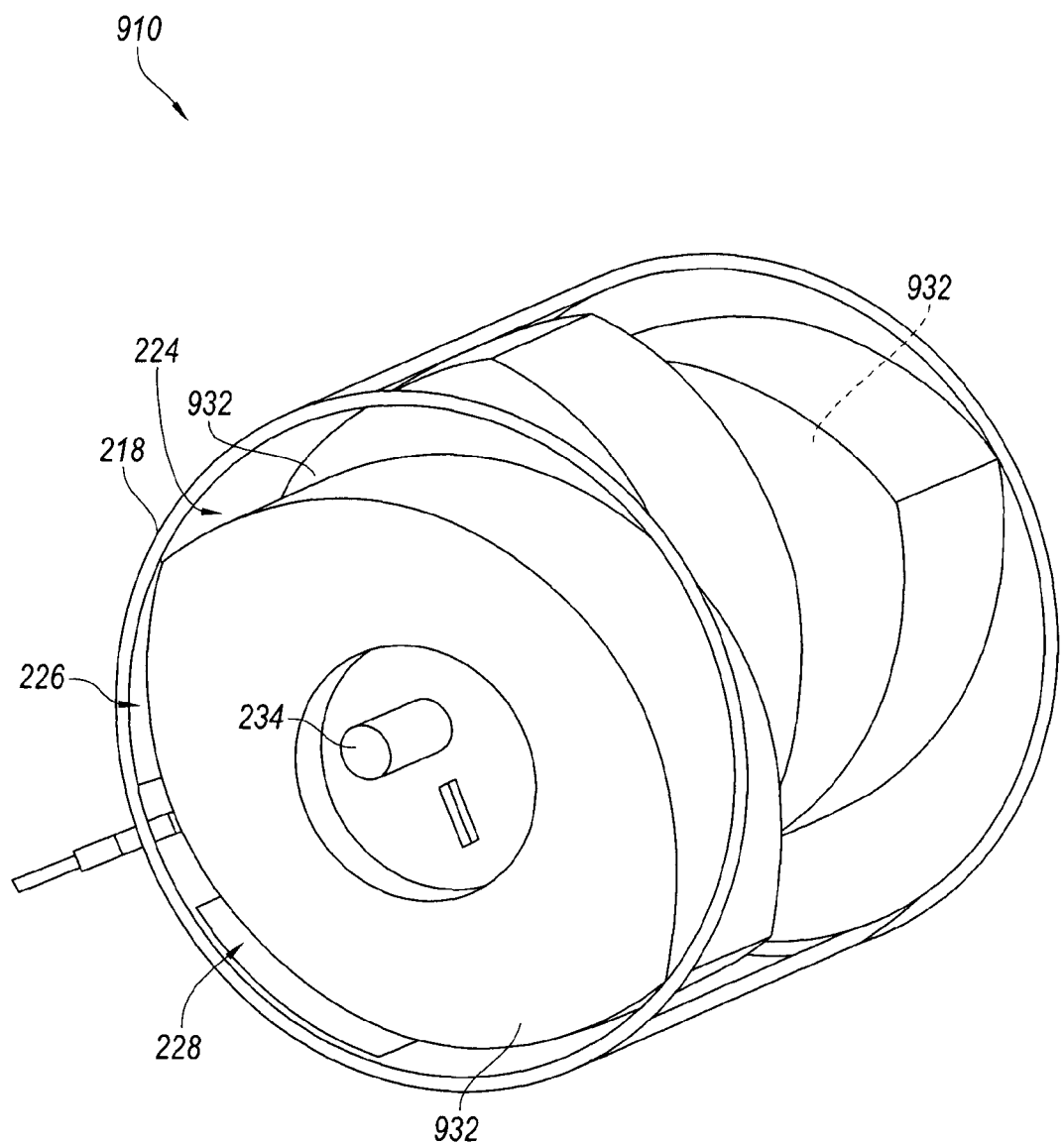
FIG. 9 is a partially schematic isometric view of a rotary displacement system having a plurality of rotors operating in parallel in accordance with an embodiment of the disclosure.

FIG. 9 is a partially schematic isometric view of a rotary displacement system 910 having a plurality of rotors 932 (e.g., three) operating in parallel in accordance with an embodiment of the disclosure. The system 910 includes several features generally similar to those described above with reference to FIGS. 2 and 3. For example, the system 910 includes a chamber housing 218, a pressure-modifying chamber 224, and a shaft 234. The chamber housing 218 is illustrated as transparent in FIG. 9 for purposes of clarity, but in several embodiments the chamber housing 218 is not transparent. The three rotors 932 operate in parallel within the chamber housing 218. The rotors 932 can share a common first port 226 and a common second port 228 which each run axially along the chamber housing 218. The rotors 932 can further share common first and second passageways (not shown in FIG. 9). The system 910 further comprises bulkheads (which have been hidden for purposes of clarity) axially positioned between each rotor 932, so that each rotor 932 is positioned in a separate chamber 224.

The rotors 932 can be offset clockwise or counterclockwise relative to each other, so that each rotor 932 is positioned in a different orbital location within its chamber 224 at a given moment. Operating the offset rotors 932 in parallel offers several advantages. For example, the offset angles of the rotors 932 can balance the torque on a motor/generator that is coupled to the shaft 234. Specifically, vibrations and shaft-bending loads that arise from the eccentric motion of a single rotor 932 are balanced by the counter-movement of the additional rotors 932. Additionally, the offset angles further limit pressure oscillations in the first and second passageways by averaging the intake and discharge pulsations across rotors operating at different phase angles and also by increasing the volume in these flow channels. The higher volume in the flow channels reduces the risk that there will be an undesirably high discharge pressure or an undesirably low intake pressure. As discussed above, discharge from one stage can be timed to coincide with the intake of the next stage, which can smooth the overall flow and avoid undesirable pressure oscillations.

Construction Techniques

Figure 10:
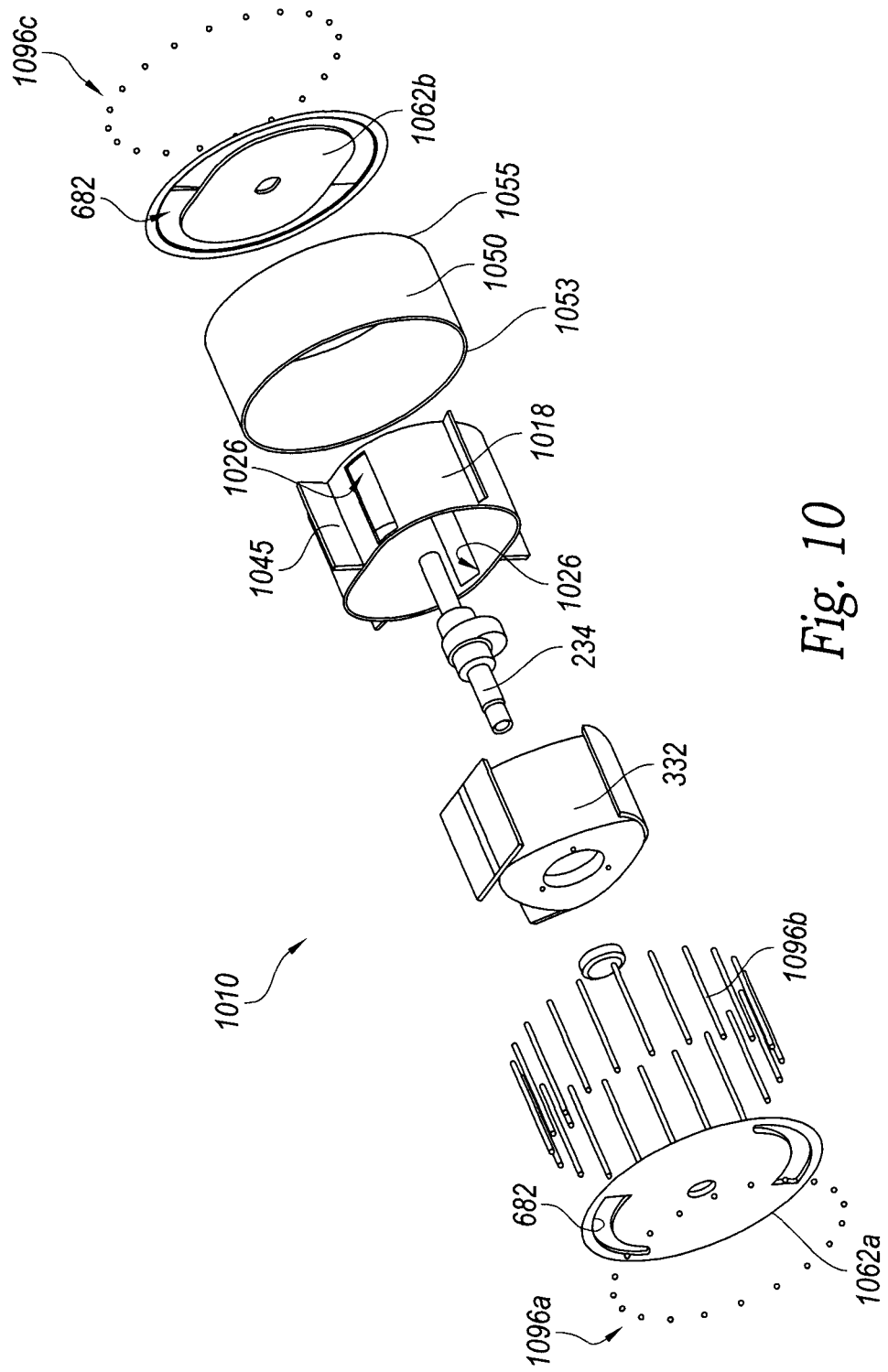
FIG. 10 is an exploded side isometric view of a rotary displacement system configured in accordance with another embodiment of the disclosure.

FIG. 10 is an exploded side isometric view of a rotary displacement system 1010 configured in accordance with another embodiment of the disclosure. The system 1010 is constructed using a "ring and plate" technique that reduces construction costs and materials. The method of construction includes forming a chamber housing 1018 and an outer housing 1050 into cylindrical sections. This can be done by various methods, including rolling and welding a plate material or by forging the material into the cylindrical shape. Port openings 1026 can be pre-cut into the plate material used to form the chamber housing 1018. Standoffs 1045 can be formed or coupled to the chamber housing 1018 to create separation between passageways in the resulting system 1010.

In some embodiments, the method can include coating one or more of the materials or structures, e.g., the heat exchanger, the distribution plate, the chamber housing 1018, and/or the outer housing 1050. For example, in some embodiments, the method can include flame-spraying coatings, such as plastic, onto structural materials, such as steel, for corrosion resistance. In other embodiments, dry lubricants such as molybdenum sulfide or graphite can be applied. Additionally or alternatively, low friction coatings such as Teflon, epoxy, or polycarbonate, may be applied to certain surfaces. In other embodiments, one or more elements of the system 1010 can be coated with a ceramic material. The method can further include axially aligning a shaft 234, a rotor 332, the chamber housing 1018, and the outer housing 1050. The shaft, rotor, and chamber housing 1018 radially nest within the outer housing 1050. In some multi-stage embodiments, the shaft 234 comprises several segmented portions which are mated with separable joints, such as male-female spline features or pinned socket joints. In particular embodiments, the shaft can be hollow.

Once the rotor 332, the shaft 234, and the chamber housing 1018 are axially aligned within the outer housing 1050, the method can further comprise positioning a first bulkhead 1062*a* on a first axial side 1053 of the outer housing 1050 and positioning a second bulkhead 1062*b* on a second axial side 1055 of the outer housing 1050. In some embodiments, the first and second bulkheads 1062*a*, 1062*b* have first and second bulkhead diameters, respectively, with the first and second bulkhead diameters greater than a diameter of the outer housing 1050 and/or a diameter of the chamber housing 1018. The bulkheads 1062*a*, 1062*b* can include one or more flow apertures 682, as discussed in more detail above with reference to FIG. 6C.

The method of construction can additionally include connecting the first bulkhead 1062*a* to the second bulkhead 1062*b* with a plurality of tension members 1096 (identified as multi-part tension members 1096*a*, 1096*b*, and 1096*c*), thereby securing the outer housing 1050 between the first bulkhead 1062*a* and the second bulkhead 1062*b* and enclosing an internal pressurizable volume. The tension members 1096 can comprise rods and bolts, latches, fasteners, and/or other connectors. In some embodiments, the tension members 1096 secure the first bulkhead 1062*a* to the second bulkhead 1062*b* radially exterior to the outer housing 1050. The bulkheads 1096 can additionally be sealed to the outer housing 1050. In other embodiments, the outer housing 1050 can be absent and the bulkheads 1062 can be positioned on first and second axial sides of the chamber housing 1018. In the case of multi-stage structures, adjacent stages can share a common bulkhead, with gasket seals between axial stages to assist carrying internal pressure loads. Gasket or o-ring seals compressed by the tension members 1096 can create robust and removable joints. Furthermore, the bulkheads 1062 can be welded or sealed to at least one of the chamber housing 1018 or outer housing 1050.

Embodiments of the ring-and-plate construction offer several advantages, including easy assembly and disassembly, and quick and direct maintenance access to the interior cavities. Another feature of the design is that it can be modular. For example, different stages can use the same or similar common parts, reducing production and machining costs. A multi-stage system similar to that illustrated in FIG. 6B can incorporate identical bulkheads having identical perforations and shaft-openings for multiple stages. In some embodiments, stage lengths can differ in order to maintain a similar pressure ratio from one stage to the next and to compress or expand air in small increments. Despite differing stage lengths, the same tools and assemblies can be used to form the chamber housing and the outer housing cylinders of different stages. Using the modular design described above, the number of stages can be easily adjusted.

Brayton Cycle

Figure 11:
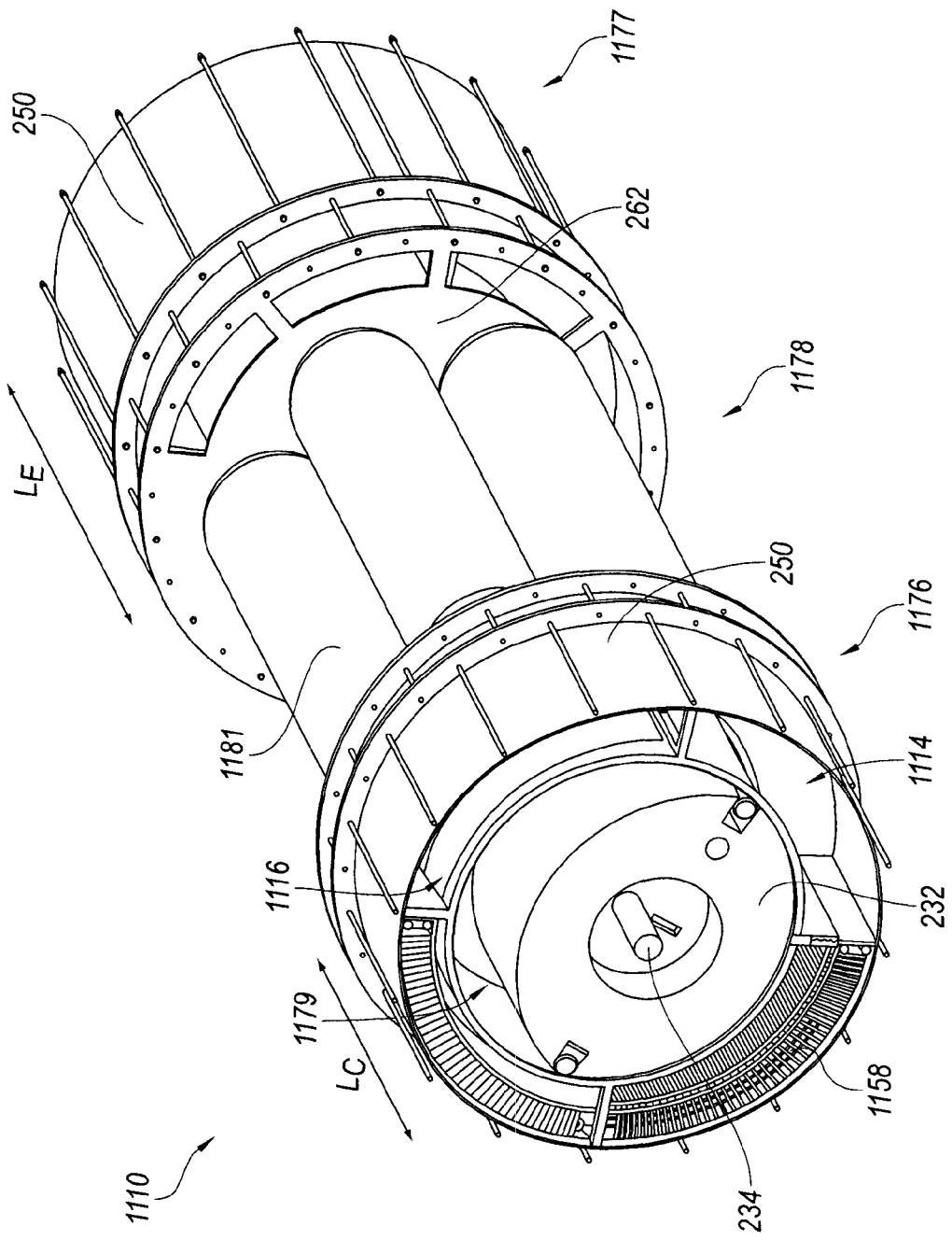
FIG. 11 is an isometric view of a rotary displacement system configured in accordance with an embodiment of the disclosure.

While many rotary displacement devices discussed above have been described in the context of bidirectional compressor/expander systems, the features and methods disclosed herein can be used in dedicated compressors and dedicated expanders as well. FIG. 11 is an isometric view of the interior of a rotary displacement system 1110 having a dedicated compressor 1176 and a dedicated expander 1177 configured in accordance with an embodiment of the disclosure. The system 1110 is configured for use as a Brayton cycle heat engine, in which the working fluid is compressed as a gas, heated, and then expanded. The system 1110 includes a dedicated compressor 1176, a heat supply 1178, and a dedicated expander 1177 in axial alignment along a shaft 234. The compressor 1176, heat source 1178, and expander 1177 can fluidly communicate through perforated bulkheads 262 or other types of fluid passageways. In some embodiments, the system 1110 comprises multiple stages of compressors and/or expanders.

The individual compressors 1176 and expanders 1177 can include any of the features described herein. For example, the illustrated compressor 1176 includes a compression chamber 1179 having input and discharge ports (not visible in FIG. 11), a two-lobed rotor 232 rotatably coupled to the shaft 234, a low-pressure passageway 1116, a high-pressure passageway 1114, a heat exchanger 1158, and an outer housing 250. The compressor 1176 is configured to introduce flow from low-pressure passageway 1116 into the compression chamber 1179 where the fluid is compressed and then discharged into a high-pressure passageway 1114. The heat exchanger 1158, integral to the compressor 1176, can be similar to those described above with reference to FIGS. 6A-6D and, in a multi-stage compressor, can cool the flow between stages, further increasing the efficiency of the compression process. In some embodiments, the system 1110 is connected to a thermal distribution system, or fluid distributor (not shown), configured to distribute heat generated during compression for space conditioning (e.g., heating and heat-driven cooling). In other embodiments, the compressor 1176 can have alternate features, such as a three-or-more-lobed rotor, a variable geometry seal, tip wideners, an axial heat exchanger, or other features.

The heat source 1178 can vary from one embodiment to another. For example, the heat source 1178 in the illustrated embodiment comprises a plurality of combustion chambers 1181. In other embodiments, the heat source 1178 may be a single combustion chamber. The heat source can use solid fuels, such as biomass or coal, liquid fuels, such as gasoline or diesel, or gaseous fuels, such as natural gas or hydrogen. In another embodiment, the heat source 1178 can comprise one or more heat exchangers, e.g., any of the types of heat exchangers described a move with reference with FIGS. 6A-6D above. For example, the heat source 1178 can include a "waste heat recovery" heat exchanger with heat exchanger fluid heated by the exhaust of an automobile engine or power plant gas turbine. Other embodiments may comprise more than one type of heat source, such as a heat exchanger followed by a combustion chamber. In some embodiments, the heat source 1178 shares a common outer housing with the compressor and the expander. The heat source outer housing is not shown in FIG. 11 for purposes of clarity.

The expander 1177 can be structurally similar or identical to the compressor 1176, except the expander 1177 is configured to introduce flow from a high-pressure passageway into an expansion chamber where the fluid is expanded and then discharged into the low-pressure passageway. An integral expander heat exchanger can heat the flow between stages in a multi-stage expander. In some embodiments, the expander 1177 has a longer axial length $L_E$ than a compressor axial length $L_C$ to accommodate the increased volume of heated flow. In the illustrated embodiments the compressor 1176, heat supply 1178, and expander 1177 are axially aligned but in other embodiments they may be radially or otherwise oriented. Furthermore, in various embodiments the compressor 1176, heat supply 1178, and/or expander 1177 can share a common shaft 234 or have separate shafts.

The various embodiments of rotary displacement devices disclosed herein offer numerous benefits, some of which have been discussed above with reference to particular features. The two- and three-lobed embodiments utilize various mechanisms (e.g., the variable geometry seal and/or the tip wideners) to eliminate the need for a check valve between the pressure-modifying chamber and the passageways. The systems can reduce or eliminate reverse flow conditions and the time that neither port is open. These mechanisms can also reduce system cost and complexity, which in turn reduces initial system cost and subsequent maintenance costs. The foregoing arrangement can also allow the systems to more quickly and dynamically alternate between the compression and expansion modes. Furthermore, the relatively large port sizes in several of the devices reduce pressure losses through the intake and exhaust ports, again increasing the overall efficiency of the device.

Several of the construction techniques disclosed herein offer cost savings over conventional techniques. Some of these include reducing material requirements, improving material durability via coating, sharing parts and production methods, effective use of waste heat, and reduced assembly and disassembly time. Combining the compressor and expander in a single efficient structure and using the same internal components, such as a common heat exchanger, for each mode of operation significantly reduces system costs over devices having separate compressors and expanders. Furthermore, several of the devices disclosed herein can operate directly coupled to an electric motor via a shaft. This reduces or eliminates costs associated with gearboxes, and reduces the overall technical complexity of the system.

The foregoing features can be particularly advantageous in the context of a compressor/expander system that is used to both store and release energy, as shown in FIG. 1. In particular the foregoing features can reduce the cost of storing and releasing energy supplied by sources that may provide energy on an intermittent, non-continuous or other variable basis. For example, several renewable energy services (e.g., solar energy and wind energy) typically provide energy in a highly variable manner. Systems and methods that reduce the cost of using such energy sources efficiently and effectively can create significant benefits, including reducing the use of fossil fuels and therefore reducing global warming and dependence on foreign energy sources.

From the foregoing, it will be appreciated that specific embodiments of the technology have been described herein for purposes of illustration, but that various modifications may be made without deviating from the technology. For example, several features of the disclosure are discussed in the context of a bidirectional rotary displacement system. Many of these features, including tip-wideners, variable geometry seals, integral heat exchangers, hollow rotors, construction techniques, materials, and chamber/rotor geometry can be applied in the context of systems that are not bidirectional. In particular embodiments, these and other features can be applied to dedicated compressor or expander systems and/or to systems having other features generally similar to those described herein. In particular embodiments, some or all of the features can be used in the context of two-lobed rotors and/or rotors having more than two lobes, multistage systems, and/or parallel intake and output arrangements, with or without integral heat exchangers.

Certain aspects of the technology described in the context of particular embodiments may be combined or eliminated in other embodiments. For example, some embodiments may not include one or more of the following features: tip rollers or other sealing features, tip wideners, a variable geometry seal, multiple stages, material coatings, ring-and-plate construction techniques, a hollow rotor, or other features disclosed herein. Further, while advantages associated with certain embodiments have been described in the context of those embodiments, other embodiments may also exhibit such advantages and not all embodiments need necessarily exhibit such advantages to fall within the scope of the present technology. Accordingly, the present disclosure and associated technology can encompass other embodiments not expressly described or shown herein.

We claim:

1. A rotary displacement system comprising:
    a chamber housing having a pressure-modifying chamber with a first port and a second port;
    a first passageway in fluid communication with the chamber via the first port;
    a second passageway in fluid communication with the chamber via the second port;
    an insulator positioned around the first passageway, the second passageway, and at least a portion of the chamber housing;
    a shaft positioned within the chamber housing and rotatable relative to the chamber housing about a rotational axis; and
    a rotor positioned within the pressure-modifying chamber and comprising a plurality of lobes; wherein:
        at least one of the plurality of lobes includes a tip at a radially outermost portion of the lobe;
        the tip has a tip circumferential length;
        the rotor includes a tip widener coupled proximate to the tip and extending circumferentially therefrom;
        the tip widener has a tip widener circumferential length greater than the tip circumferential length; and
        the rotor is carried by and eccentrically rotatable relative to the shaft.

2. The system of claim 1 wherein the rotor is alternately operable in a first mode in which a fluid flow is provided from the second passageway to the first passageway via the chamber and in a second mode in which the fluid flow is provided from the first passageway to the second passageway via the chamber.

3. The system of claim 1 wherein the tip widener comprises a flexible arm.

4. The system of claim 1 wherein:
    the first port has a first port circumferential length;
    the second port has a second port circumferential length; and
    the tip widener circumferential length is greater than or equal to each of the first port circumferential length and the second port circumferential length.

5. The system of claim 1 wherein the tip widener includes an arm pivotably coupled to the at least one of the plurality of lobes.

6. The system of claim 1 wherein no valves are positioned to control a fluid flow (a) between the chamber and the first passageway and (b) between the chamber and the second passageway.

7. The system of claim 1 wherein:
    the tip widener includes a first tip widener, and wherein the rotor further includes a second tip widener and a third tip widener, wherein each tip widener is coupled to an individual tip; and no valves are positioned to control a fluid flow (a) between the chamber and the first passageway and (b) between the chamber and the second passageway.

8. The system of claim 1, further comprising:
at least one of a motor, a generator, or a combined motor/generator coupled to the shaft;
a controller coupled to the shaft, wherein the controller is operable to redirect the rotor between operation in the first mode and the second mode by reversing a rotation direction of the shaft; and
a fluid storage reservoir in fluid communication with the first and second passageways, and wherein the rotation direction of the shaft controls fluid flow between the reservoir and the first and second passageways.

9. A rotary displacement system comprising:
a chamber housing having a pressure-modifying chamber with a first port and a second port;
a first passageway in fluid communication with the chamber via the first port;
a second passageway in fluid communication with the chamber via the second port;
an insulator positioned around the first passageway, the second passageway, and at least a portion of the chamber housing;
a shaft positioned within the chamber housing and rotatable relative to the chamber housing about a rotational axis; and
a lobed rotor positioned within the pressure-modifying chamber wherein:
the rotor is carried by and eccentrically rotatable relative to the shaft;
the rotor is alternately operable in a first mode in which a fluid flow is provided from the second passageway to the first passageway via the chamber and in a second mode in which the fluid flow is provided from the first passageway to the second passageway via the chamber;
the rotor includes at least one rotor wall comprising one or more materials; and
the rotor comprises one or more internal cavities including a port positioned to direct a fluid to the chamber.

10. The system of claim 9, further comprising filler material positioned within an individual rotor cavity.

11. The system of claim 9 wherein the rotor comprises welded plates.

12. The system of claim 9 wherein:
the rotor comprises a rotor frame;
the rotor occupies a rotor volume; and
the rotor frame occupies about five percent or less of the rotor volume.

13. The system of claim 9, further comprising a stiffening structure positioned within the rotor.

14. A rotary displacement system comprising:
a chamber housing having a pressure-modifying chamber with a first port and a second port;
a first passageway in fluid communication with the chamber via the first port;
a second passageway in fluid communication with the chamber via the second port;
a shaft positioned within the chamber housing and rotatable relative to the chamber housing about a rotational axis;
a lobed rotor positioned within the pressure-modifying chamber, wherein the rotor is carried by and eccentrically rotatable relative to the shaft, and wherein the rotor is alternately operable in a first mode in which a fluid flow is provided from the second passageway to the first passageway via the chamber and in a second mode in which the fluid flow is provided from the first passageway to the second passageway via the chamber;
an insulator positioned around the first passageway, the second passageway, and at least a portion of the chamber housing; and
a pressure vessel having an inner surface and an outer surface, wherein:
the pressure vessel at least partially surrounds the chamber housing, the first passageway, and the second passageway; and
the insulator is positioned around at least a portion of the outer surface of the pressure vessel.

15. The system of claim 14 wherein the insulator includes a fiberglass filler.

16. The system of claim 14 wherein the insulator comprises an air gap insulator.

17. The system of claim 14 further comprising a heat exchanger at least partially surrounded by the insulator.

18. A rotary displacement system comprising:
a chamber housing having a pressure-modifying chamber with a first port and a second port, wherein the chamber housing has an inner radial diameter, an outer radial diameter, a first axial side, and a second axial side;
a first passageway in fluid communication with the chamber via the first port;
a second passageway in fluid communication with the chamber via the second port;
an insulator positioned around the first passageway, the second passageway, and at least a portion of the chamber housing;
a shaft positioned within the chamber housing and rotatable relative to the chamber housing about a rotational axis;
a lobed rotor carried by and eccentrically rotatable relative to the shaft, wherein the rotor includes at least one tip widener extending circumferentially from at least one lobe;
a first bulkhead plate and a second bulkhead plate, wherein the first bulkhead plate has a first diameter and the second bulkhead plate has a second diameter, and wherein the first diameter and the second diameter are greater than the chamber housing outer radial diameter, and further wherein the first bulkhead plate is positioned axially adjacent the first axial side of the chamber housing and the second bulkhead plate is positioned axially adjacent the second axial side of the chamber housing; and
a plurality of connectors securing the first bulkhead plate to the second bulkhead plate.

19. The system of claim 18 wherein the connectors comprise bolts.

20. The system of claim 18 further comprising an outer housing surrounding the chamber housing, the first passageway, and the second passageway.

21. An engine system, comprising:
a rotary compressor that includes:
a first chamber housing having a first pressure-modifying chamber with a first input port and a first discharge port;
a first low-pressure passageway in fluid communication with the first chamber via the first input port;
a first high-pressure passageway in fluid communication with the first chamber via the first discharge port, wherein no valves are positioned to control a fluid flow (a) between the first chamber and the first low-pressure passageway and (b) between the first chamber and the first high-pressure passageway;

a first insulator positioned around the first low-pressure passageway, the first high-pressure passageway, and at least a portion of the first chamber housing;

a first shaft positioned within the chamber housing and rotatable relative to the chamber housing about a rotational axis; and a first multi-lobed rotor carried by and eccentrically rotatable relative to the first shaft within the first pressure-modifying chamber;

a heat source in fluid communication with the rotary compressor; and a rotary expander in fluid communication with the heat source, the expander comprising:

a second chamber housing having a second pressure-modifying chamber with a second input port and a second discharge port;

a second high-pressure passageway in fluid communication with the second chamber via the second input port;

a second low-pressure passageway in fluid communication with the second chamber via the second discharge port wherein no valves are positioned to control the fluid flow (a) between the second chamber and the second low-pressure passageway and (b) between the second chamber and the second high-pressure passageway;

a second insulator positioned around the second low-pressure passageway, the second high-pressure passageway, and at least a portion of the second chamber housing;

a second shaft positioned within the chamber housing and rotatable relative to the chamber housing about a rotational axis; and a second multi-lobed rotor carried by and eccentrically rotatable relative to the second shaft within the second pressure-modifying chamber.

22. The system of claim 21 wherein the heat source comprises a heat exchanger.

23. The system of claim 22 wherein the system heat exchanger is at least one of a phase-change heat exchanger, a finned-tube heat exchanger, or a gas-to-gas heat exchanger.

24. The system of claim 21, further comprising a fluid distribution plate in fluid communication with at least one of the compressor or the expander.

25. The system of claim 21, wherein the first shaft comprises a first portion of a common shaft and the second shaft comprises a second portion of the common shaft.

26. An engine system, comprising:

a rotary compressor comprising:

a first chamber housing having a first pressure-modifying chamber with a first input port and a first discharge port;

a first low-pressure passageway in fluid communication with the first chamber via the first input port;

a first high-pressure passageway in fluid communication with the first chamber via the first discharge port;

a first insulator positioned around the first low-pressure passageway, the first high-pressure passageway, and at least a portion of the first chamber housing;

a shaft positioned within the chamber housing and rotatable relative to the chamber housing about a rotational axis; and a first multi-lobed rotor carried by and eccentrically rotatable relative to the shaft, wherein the compressor further comprises at least one of a first tip widener extending circumferentially from an individual first rotor lobe or a first variable geometry seal positioned in the first chamber housing between the first input port and the first discharge port;

a heat source in fluid communication with the rotary compressor; and a rotary expander in fluid communication with the heat source, the expander comprising:

a second chamber housing having a second pressure-modifying chamber with a second input port and a second discharge port;

a second high-pressure passageway in fluid communication with the second chamber via the second input port;

a second low-pressure passageway in fluid communication with the second chamber via the second discharge port;

a second insulator positioned around the second low-pressure passageway, the second high-pressure passageway, and at least a portion of the second chamber housing and a second shaft positioned within the chamber housing and rotatable relative to the chamber housing about a rotational axis; and a second multi-lobed rotor carried by and eccentrically rotatable relative to the shaft, wherein the expander further comprises at least one of a second tip widener extending circumferentially from an individual second rotor lobe or a second variable geometry seal positioned in the second chamber housing between the second input port and the second discharge port.

27. The system of claim 26 wherein the heat source comprises a heat exchanger.

28. The system of claim 26 wherein the heat source comprises a combustor.

29. The system of claim 28 wherein the combustor is axially positioned between the compressor and the expander.

30. The system of claim 26 wherein the heat source includes a waste heat recovery unit coupled to a heat source external to the rotary compressor and the rotary expander.

31. The system of claim 26 wherein the first rotor has no more than two lobes and the second rotor has no more than two lobes.

32. The system of claim 26, wherein the first shaft comprises a first portion of a common shaft and the second shaft comprises a second portion of the common shaft.

* * * * *

UNITED STATES PATENT AND TRADEMARK OFFICE
CERTIFICATE OF CORRECTION

PATENT NO. : 9,057,265 B2
APPLICATION NO. : 13/038345
DATED : June 16, 2015
INVENTOR(S) : Scott R. Frazier et al.

Page 1 of 1

It is certified that error appears in the above-identified patent and that said Letters Patent is hereby corrected as shown below:

On the title page, item 56

On the page 3, in column 2, under "Other Publications", line 5, delete "Koh" and insert -- High --, therefor.

Signed and Sealed this
Fifteenth Day of December, 2015

Michelle K. Lee
*Director of the United States Patent and Trademark Office*